United States Patent
Tie et al.

(10) Patent No.: US 12,531,728 B2
(45) Date of Patent: Jan. 20, 2026

(54) IDENTITY AUTHENTICATION METHOD, AUTHENTICATION ACCESS CONTROLLER, REQUESTING DEVICE, STORAGE MEDIUM, PROGRAM, AND PROGRAM PRODUCT

(71) Applicant: CHINA IWNCOMM CO., LTD., Shaanxi (CN)

(72) Inventors: Manxia Tie, Xi'an (CN); Jun Cao, Xi'an (CN); Xiaorong Zhao, Xi'an (CN); Xiaolong Lai, Xi'an (CN); Qin Li, Xi'an (CN); Bianling Zhang, Xi'an (CN); Xiang Yan, Xi'an (CN); Dandan Ma, Xi'an (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 235 days.

(21) Appl. No.: 18/259,305

(22) PCT Filed: Dec. 21, 2021

(86) PCT No.: PCT/CN2021/140161
§ 371 (c)(1),
(2) Date: Jun. 26, 2023

(87) PCT Pub. No.: WO2022/135413
PCT Pub. Date: Jun. 30, 2022

(65) Prior Publication Data
US 2024/0056296 A1     Feb. 15, 2024

(30) Foreign Application Priority Data
Dec. 26, 2020   (CN) .......................... 202011569202.X

(51) Int. Cl.
*H04L 9/08*     (2006.01)
*H04L 9/30*     (2006.01)

(52) U.S. Cl.
CPC ................ *H04L 9/088* (2013.01); *H04L 9/30* (2013.01)

(58) Field of Classification Search
CPC .................................. H04L 9/088; H04L 9/30
See application file for complete search history.

(56) References Cited

U.S. PATENT DOCUMENTS

| | | | |
|---|---|---|---|
| 8,787,574 B2 * | 7/2014 | Hu | H04W 12/106 713/168 |
| 9,407,611 B2 * | 8/2016 | Kato | H04L 63/0457 |

(Continued)

FOREIGN PATENT DOCUMENTS

| | | |
|---|---|---|
| CN | 101635710 A | 1/2010 |
| CN | 103763321 A | 4/2014 |
| CN | 108259157 A | 7/2018 |

OTHER PUBLICATIONS

International Search Report in the international application No. PCT/CN2021/140161, mailed on Mar. 23, 2022, 2 pages.

(Continued)

*Primary Examiner* — Yonas A Bayou
(74) *Attorney, Agent, or Firm* — Cooper Legal Group, LLC

(57) ABSTRACT

Disclosed in embodiments of the present application are an identity authentication method. Bidirectional or unidirectional identity authentication between an authentication access controller and a requesting device is implemented by using a pre-shared key, thereby laying a foundation for ensuring that a user accessing a network is legitimate and/or a network accessed by a user is legitimate, so as to implement secret communication between the requesting device and the authentication access controller. In addition, in an identity authentication process, a verified party performs calculation on information comprising the pre-shared key of two parties and random numbers respectively generated by (Continued)

the two parties to obtain an identity authentication key, and performs calculation on specified content by using the identity authentication key to obtain an identity authentication code of the verified party. According to the method for calculating an identity authentication code provided by the present application, key exchange calculation is combined, and the capability of resistance to dictionary brute-force attack or to quantum computing attack in the authentication process is enhanced by means of an ingenious detail design. Also disclosed in the embodiments of the present application are an authentication access controller, a requesting device, a storage medium, a program, and a program product.

20 Claims, 8 Drawing Sheets

(56) References Cited

U.S. PATENT DOCUMENTS

| | | | | |
|---|---|---|---|---|
| 9,954,839 | B2* | 4/2018 | Ahmed | H04L 63/205 |
| 10,050,781 | B2* | 8/2018 | Yuan | H04L 63/061 |
| 2005/0108531 | A1* | 5/2005 | Swander | H04L 9/0844 |
| | | | | 713/171 |
| 2006/0227807 | A1* | 10/2006 | Jakubik | H04L 61/2517 |
| | | | | 370/466 |
| 2007/0198836 | A1* | 8/2007 | Fedyk | H04L 9/0833 |
| | | | | 713/171 |
| 2008/0227548 | A1* | 9/2008 | Choudhry | A63F 13/12 |
| | | | | 463/42 |
| 2012/0159587 | A1 | 6/2012 | Ge | |
| 2015/0159587 | A1* | 6/2015 | Facciano | F02K 9/76 |
| | | | | 60/250 |
| 2017/0272945 | A1 | 9/2017 | Link, II | |
| 2020/0295933 | A1* | 9/2020 | Link | H04W 4/70 |

OTHER PUBLICATIONS

English translation of the Written Opinion of the International Search Authority in the international application No. PCT/CN2021/140161, mailed on Mar. 23, 2022, 5 pages.
Praneeth Kemparaj: "4-Way Hand shake, Keys generation and MIC Verification-WPA2-Praneeth's Blog", Nov. 9, 2019 (Nov. 9, 2019), XP093151817, figures 1,2, p. 1-p. 10, 21 pages.
Anonymous: "IEEE 802.11i-2004-Wikipedia", Dec. 23, 2020 (Dec. 23, 2020), XP093151832, p. 1-p. 3, 5 pages.
Anonymous: "WPA3 Dragonfly Handshake", Nov. 20, 2018 (Nov. 20, 2018), XP093151837, p. 1-p. 7, 14 pages.
Supplementary European Search Report in the European application No. 21909409.1, mailed on Apr. 24, 2024, 12 pages.

* cited by examiner

IDENTITY AUTHENTICATION METHOD, AUTHENTICATION ACCESS CONTROLLER, REQUESTING DEVICE, STORAGE MEDIUM, PROGRAM, AND PROGRAM PRODUCT

CROSS-REFERENCE TO RELATED APPLICATION

The present disclosure is filed on the basis of Chinese Patent Application No. 202011569202.X, filed on Dec. 26, 2020 and entitled "Identity Authentication Method and Device", and claims priority to this Chinese patent application, the disclosure of which is hereby incorporated by reference in its entirety.

TECHNICAL FIELD

The present disclosure relates to the technical field of network communication security, in particular to an identity authentication method, an authentication access controller, a requester, a storage medium, a program, and a program product.

BACKGROUND

In a communication network, a requester may access the network through an authentication access controller. In some cases where security requirements are relatively high, the authentication access controller needs to authenticate the identity of the requester, and sometimes the requester also needs to authenticate the identity of the authentication access controller, to lay the foundation for ensuring that the requester accessing the network belongs to a legal user and/or the network accessed by the requester is a legal network, so as to achieve secure communication between the requester and the authentication access controller. Furthermore, node-to-node transmission in blockchain technology also requires that a trust relationship is established between different nodes, so that identity authentication performed on nodes is also very important.

Currently, a requester and an authentication access controller can use a pre-shared key to perform identity authentication, and such an authentication mechanism is simple and quick. However, in actual applications, the pre-shared key is susceptible to dictionary brute force attacks, so that such an authentication mechanism is not secure, and cannot meet the high security requirements of identity authentication services.

SUMMARY

To address the above technical problem, provided in embodiments of the present disclosure are an identity authentication method, an authentication access controller, a requester, a storage medium, a program, and a program product. Mutual or unilateral identity authentication is performed between an authentication access controller and a requester by using a pre-shared key, to lay the foundation for ensuring that a user accessing a network is legal and/or a network accessed by a user is legal, so as to achieve secure communication between the requester and the authentication access controller. In addition, a key exchange algorithm is combined, which enhances the capability of the authentication process against dictionary brute force attacks or quantum computation attacks by an ingenious detail design.

Provided in the embodiments of the present disclosure is the following technical solution.

According to a first aspect, provided in an embodiment of the present disclosure is an identity authentication method, one of a requester and an authentication access controller is used as a verified party, and the other one is used as a corresponding verifying party, the method includes following operations.

The verified party sends an identity authentication request message of the verified party to the verifying party, the identity authentication request message of the verified party includes an identity authentication code of the verified party, where the identity authentication code of the verified party is obtained by the verified party by using an identity authentication key to perform calculation on specified content including a first key.

The verifying party uses the identity authentication key and the specified content to check the identity authentication code of the verified party to obtain a check result, the identity authentication key being obtained by performing calculation on information including a pre-shared key between the verifying party and the verified party.

The verifying party determines an identity authentication result of the verified party according to the check result.

According to a second aspect, provided in an embodiment of the present disclosure is an authentication access controller, including at least one of a requesting portion or a processing portion.

The requesting portion is configured to send an identity authentication request message of the authentication access controller to a requester, the identity authentication request message of the authentication access controller includes an identity authentication code of the authentication access controller, where the identity authentication code of the authentication access controller is obtained by the authentication access controller by using an identity authentication key to perform calculation on specified content including a first key.

The processing portion is configured to receive an identity authentication request message of the requester from the requester, the identity authentication request message of the requester includes an identity authentication code of the requester, where the identity authentication code of the requester is obtained by the requester by using an identity authentication key to perform calculation on specified content including a first key.

The processing portion is further configured to use the identity authentication key and the specified content to check the identity authentication code of the requester to obtain a check result, and determine an identity authentication result of the requester according to the check result, the identity authentication key is obtained by performing calculation on information including a pre-shared key between the requester and the authentication access controller.

According to a third aspect, provided in an embodiment of the present disclosure is a requester, including at least one of a requesting portion or a processing portion, The requesting portion is configured to send an identity authentication request message of the requester to an authentication access controller, the identity authentication request message of the requester includes an identity authentication code of the requester, where the identity authentication code of the requester is obtained by the requester by using an identity authentication key to perform calculation on specified content including a first key.

The processing portion is configured to receive an identity authentication request message of the authentication access controller from the authentication access controller, the identity authentication request message of the authentication access controller includes an identity authentication code of the authentication access controller, where the identity authentication code of the authentication access controller is obtained by the authentication access controller by using the identity authentication key to perform calculation on the specified content including a first key.

The processing portion is further configured to use the identity authentication key and the specified content to check the identity authentication code of the authentication access controller to obtain a check result, and determine an identity authentication result of the authentication access controller according to the check result, the identity authentication key being obtained by performing calculation on information including a pre-shared key between the authentication access controller and the requester.

According to a fourth aspect, provided in an embodiment of the present disclosure is an authentication access controller, includes a first processor and a first processor for storing instructions executable by the first processor.

The first processor is configured to call the instructions stored in the first memory to perform operations performed by the authentication access controller according to the first aspect.

According to a fifth aspect, provided in an embodiment of the present disclosure is a requester, includes a second processor and a second memory for storing instructions executable by the second processor.

The second processor is configured to call the instructions stored in the second memory to perform operations performed by the requester according to the first aspect.

According to a sixth aspect, provided in an embodiment of the present disclosure is a computer-readable storage medium, having a computer program stored thereon, the computer program performs, when run by a processor, operations performed by the authentication access controller or the requester according to the first aspect.

According to a seventh aspect, provided in an embodiment of the present disclosure is a computer program, including computer-readable code, when the computer-readable code is run in a computer apparatus, a processor in the computer apparatus performs operations performed by the authentication access controller or the requester according to the first aspect.

According to an eighth aspect, provided in an embodiment of the present disclosure is a computer program product, including computer program instructions, the computer program instructions causes a computer to perform operations performed by the authentication access controller or the requester according to the first aspect.

It can be seen from the above technical solution that in the identity authentication method provided in the embodiment of the present disclosure, mutual or unilateral identity authentication is performed between an authentication access controller and a requester by using a pre-shared key, to lay the foundation for ensuring that a user accessing a network is legal and/or a network accessed by a user is legal, so as to achieve secure communication between the requester and the authentication access controller. In addition, in an identity authentication process, a verified party performs calculation on information including a pre-shared key of the two parties to obtain an identity authentication key, and uses the identity authentication key to perform calculation on specified content to obtain an identity authentication code of the verified party. Such an identity authentication code calculation manner provided in the embodiment of the present disclosure incorporates key exchange calculation, which enhances the capability of the authentication process against the dictionary brute force attacks or quantum computation attacks through the ingenious detail design.

BRIEF DESCRIPTION OF THE DRAWINGS

In order to describe the technical solutions in the embodiments of the present disclosure or in the prior art more clearly, accompanying drawings to be used for description of the embodiments or the prior art will be briefly introduced below. Apparently, the accompanying drawings in the following description merely illustrate some of the embodiments of the present disclosure. Those of ordinary skill in the art can further obtain other accompanying drawings according to these accompanying drawings without the exercise of inventive effort.

DETAILED DESCRIPTION

Figure 1:
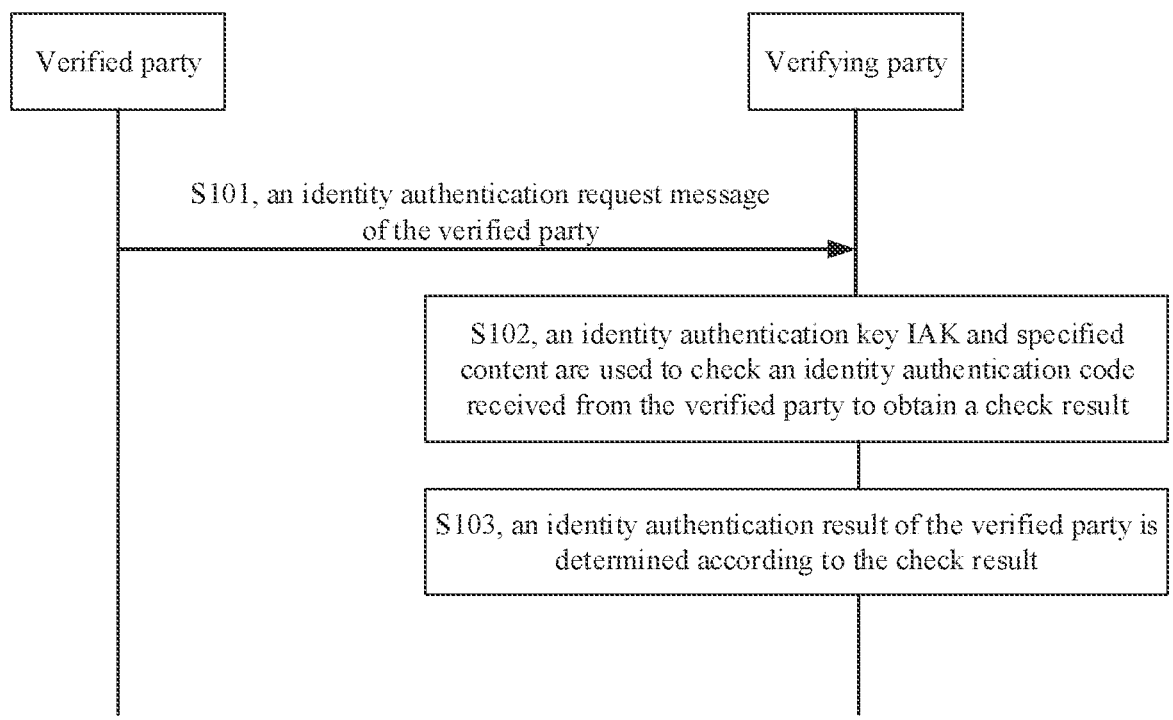
FIG. 1 is a schematic diagram of an identity authentication method according to an embodiment of the present disclosure.

In a communication network, a requester may access the network through an authentication access controller. In order to ensure that the requester accessing the network is a legal user and/or the network that a user requests to access is a legal network, mutual or unilateral identity authentication typically needs to be performed between the authentication access controller and the requester.

For example, in a scenario where a requester accesses a wireless network through an authentication access controller, the requester may be a terminal device such as a mobile phone, a personal digital assistant (PDA), a tablet computer, or the like, and the authentication access controller may be a wireless access point. In a scenario where a requester accesses a wired network through an authentication access controller, the requester may be a terminal device such as a desktop computer, a notebook computer, or the like, and the authentication access controller may be a switch, a router, or the like. In a scenario where a requester accesses a network of the 4th/5th Generation mobile communication technology (4G/5G) through an authentication access controller, the requester may be a mobile phone, and the authentication access controller may be a base station. Certainly, the embodiments of the present disclosure are equally applicable to various data communication scenarios such as other wired networks, near field communication networks, etc.

Currently, a pre-shared key is used to achieve mutual or unilateral authentication between the authentication access controller and the requester, so as to meet actual application requirements. However, the existing mechanism of using a pre-shared key to perform identity authentication is susceptible to dictionary brute force attacks, or cannot resist quantum computation attacks. Therefore, the existing mechanism of using a pre-shared key to perform mutual or unilateral identity authentication on an authentication access controller and a requester is not secure.

To address the above technical problem, provided in an embodiment of the present disclosure is an identity authentication method. One of a requester and an authentication access controller is used as a verified party, and the other one is used as a verifying party. During identity authentication, the verified party sends an identity authentication request message of the verified party to the verifying party. The identity authentication request message of the verified party includes an identity authentication code of the verified party. The identity authentication code of the verified party is obtained by the verified party by using an identity authentication key to perform calculation on specified content. The specified content herein includes a first key. The first key may be pre-shared or negotiated by the verified party and the verifying party. Upon receiving the identity authentication request message of the verified party, the verifying party uses the identity authentication key and the specified content to check the identity authentication code received from the verified party to obtain a check result. The identity authentication key is obtained by performing calculation on information including a pre-shared key of the verifying party and the verified party. The verifying party determines an identity authentication result of the verified party according to the check result.

It can be seen that in the identity authentication method provided in the embodiment of the present disclosure, mutual or unilateral identity authentication is performed between an authentication access controller and a requester by using a pre-shared key, to lay the foundation for ensuring that a user accessing a network is legal and/or a network accessed by a user is legal, so as to achieve secure communication between the requester and the authentication access controller. In addition, in an identity authentication process, a verified party performs calculation on information including a pre-shared key of the verifying party and the verified party to obtain an identity authentication key, and uses the identity authentication key to perform calculation on specified content to obtain an identity authentication code of the verified party. Such an identity authentication code calculation manner provided in the embodiment of the present disclosure incorporates key exchange calculation, which enhances the capability of the authentication process against the dictionary brute force attacks or quantum computation attacks through ingenious detail design.

It should be noted that the identity authentication method provided in the embodiment of the present disclosure can achieve not only mutual identity authentication (MIA) between an authentication access controller (AAC) and a requester (REQ), but also REQ authentication with an unauthenticated AAC (RAUA) and AAC Authentication with an unauthenticated REQ (AAUR).

The REQ may be an end point participating in an identity authentication process, and applies to the AAC for a specified access service. The AAC may be another end point participating in the identity authentication process, and provides the specified access service to the REQ. Before a pre-shared key is used to achieve the mutual or unilateral identity authentication between the REQ and the AAC, the pre-shared key (PSK) is present between the REQ and the AAC. The PSK is the same key preconfigured or allocated by the REQ and the AAC, and the REQ and the AAC have IDs capable of identifying the REQ and the AAC.

In an identity authentication method provided in an embodiment of the present disclosure, each one of an AAC and a REQ may be used as a verified party, and the other one may be used as a corresponding verifying party. The verifying party is used to perform identity authentication on the verified party. Thai is, the verifying party is used to verify legality of identity of the verified party.

In an implementation manner, the REQ is used as a verified party while the AAC is used as a corresponding verifying party; and the AAC is also used as a verified party while the REQ is used as a corresponding verifying party. The AAC is used to verify legality of identity of the REQ, and the REQ is used to verify legality of identity of the AAC. That is, mutual identity authentication (MIA) between the REQ and the AAC is achieved.

In another implementation manner the REQ is used as a verified party, and the AAC is used as a corresponding verifying party. The AAC is used to verify legality of identity of the REQ, thereby achieving REQ authentication with the unauthenticated AAC (RAUA).

In yet another implementation manner the AAC is used as a verified party, and the REQ is used as a corresponding verifying party. The REQ is used to verify legality of identity of the AAC, thereby achieving AAC Authentication with the Unauthenticated REQ (AAUR).

An identity authentication method shown in FIG. 1 will be described below with reference to FIG. 1, and the method is performed by the verifying party and the verified party. The method includes the following operations.

At S101, the verified party sends an identity authentication request message of the verified party to the verifying party.

The identity authentication request message of the verified party includes an identity authentication code of the verified party. The identity authentication code of the verified party is obtained by the verified party by using an identity authentication key and a message integrity check algorithm to perform calculation on specified content, and the specified content herein includes a first key. The first key is pre-shared or negotiated by the verified party and the verifying party. For example, the first key is obtained by the verified party by performing key exchange calculation according to a temporary private key corresponding to a key exchange parameter of the verified party and a temporary public key recovered from a key exchange parameter of the verifying party. Key exchange refers to a key exchange algorithm such as Diffie-Hellman (DH), etc. The temporary private key corresponding to the key exchange parameter of the verified party corresponds to a temporary public key generated by the verified party. The temporary public key generated by the verified party and the temporary private key corresponding to the key exchange parameter of the verified party are a temporary public-private key pair. The temporary public key recovered from the key exchange parameter of the verifying party corresponds to a temporary private key generated by the verifying party. The temporary public key recovered from the key exchange parameter of the verifying party and the temporary private key generated by the verifying party are a temporary public-private key pair.

The identity authentication key is obtained by performing calculation on information including a pre-shared key between the verifying party and the verified party. That is, an identity authentication key is calculated by an REQ and an AAC by using information including the same pre-shared key of the REQ and the AAC. An implementation manner in which the AAC and the REQ calculate the identity authentication key will be described in subsequent embodiments.

When mutual identity authentication is performed between the REQ and the AAC, and the REQ is used as the verified party, optionally, the specified content further includes an identifier $ID_{REQ}$ Of the REQ; when the AAC is used as the verified party, the specified content further includes an identifier $ID_{AAC}$ of the AAC.

That is, when mutual identity authentication is performed on the REQ and the AAC, when the REQ is used as the verified party, and the AAC is used as the verifying party, the REQ sends an identity authentication request message REQAuth of the REQ to the AAC, and REQAuth includes an identity authentication code $MIC_{REQ}$ of the REQ. $MIC_{REQ}$ is obtained by the REQ by using an identity authentication key (IAK) and an integrity check algorithm to perform calculation on specified content. The specified content herein may include a first key K and $ID_{REQ}$. The first key K is obtained by the REQ by performing key exchange calculation according to a temporary private key corresponding to a key exchange parameter $KeyInfo_{REQ}$ generated by the REQ and a temporary public key recovered from a key exchange parameter $KeyInfo_{AAC}$ of the AAC.

When the AAC is used as the verified party, and when the REQ is used as the verifying party, the AAC sends an identity authentication request message AACAuth of the AAC to the REQ, and AACAuth includes an identity authentication code $MIC_{AAC}$ of the AAC. $MIC_{AAC}$ is obtained by the AAC by using an identity authentication key (IAK) and an integrity check algorithm to perform calculation on specified content. The specified content herein may include a first key K and $ID_{AAC}$. The first key K is obtained by the AAC by performing key exchange calculation according to a temporary private key corresponding to a key exchange parameter $KeyInfo_{AAC}$ generated by the AAC and a temporary public key recovered from a key exchange parameter $KeyInfo_{REQ}$ of the REQ.

When unilateral identity authentication is performed on the REQ or the AAC, optionally, the specified content further includes the identifier $ID_{AAC}$ of the AAC and the identifier $ID_{REQ}$ of the REQ.

That is, when unilateral identity authentication is performed on the REQ, when the REQ is used as the verified party, and the AAC is used as the verifying party, the identity authentication code $MIC_{REQ}$ of the REQ included in the identity authentication request message REQAuth of the REQ may be obtained by the REQ by using an identity authentication key (IAK) and an integrity check algorithm to perform calculation on specified content. The specified content herein may include a first key K, $ID_{AAC}$, and $ID_{REQ}$. The first key K is obtained by the REQ by performing key exchange calculation according to a temporary private key corresponding to a key exchange parameter $KeyInfo_{REQ}$ generated by the REQ and a temporary public key recovered from a key exchange parameter $KeyInfo_{AAC}$ of the AAC.

That is, when unilateral identity authentication is performed on the AAC, when the AAC is used as the verified party, and the REQ is used as the verifying party, the identity authentication code $MIC_{AAC}$ of the AAC included in the identity authentication request message AACAuth of the AAC may be obtained by the AAC by using an identity authentication key (IAK) and an integrity check algorithm to perform calculation on specified content. The specified content herein may include a first key K, $ID_{AAC}$, and $ID_{REQ}$. The first key K is obtained by the AAC by performing key exchange calculation according to a temporary private key corresponding to a key exchange parameter $KeyInfo_{AAC}$ generated by the AAC and a temporary public key recovered from a key exchange parameter $KeyInfo_{REQ}$ of the REQ.

$KeyInfo_{REQ}$ may be a result obtained by the REQ by using the identity authentication key (IAK) to perform encryption calculation on information including a temporary public key generated by the REQ, and simply may be a result obtained by the REQ by performing an exclusive or (XOR) operation on information including the temporary public key generated by the REQ and a hash value of IAK, or may be a result obtained by the REQ by performing an XOR operation on information including the temporary public key generated by the REQ and an extended identity authentication key (EIAK). The EIAK is calculated by the REQ by using a key derivation algorithm according to IAK and other information (the other information used by the AAC and used by the REQ is the same, and optional, such as a particular string, etc.). $KeyInfo_{AAC}$ may be a result obtained by the AAC by using the identity authentication key (IAK) to perform encryption calculation on information including a temporary public key generated by the AAC, and simply may be a result obtained by the AAC by performing an XOR operation on information including the temporary public key generated by the AAC and a hash value of IAK, or may be a result obtained by the AAC by performing an XOR operation on information including the temporary public key generated by the AAC and an extended identity authentication key (EIAK). EIAK is calculated by the AAC by using a key derivation algorithm according to IAK and other information (the other information used by the AAC and used by the REQ is the same and optional, such as a particular string, etc.).

At S102, the verifying party uses an identity authentication key (IAK) and the specified content to check an identity authentication code received from the verified party to obtain a check result.

After the verifying party receives the identity authentication request message of the verified party, the verifying party uses the identity authentication key and the specified content to check the identity authentication code sent by the verified party, and obtains the check result. The specified content herein is completely the same as the specified content used by the verified party to calculate the identity authentication code of the verified party.

It should be noted that since the same pre-shared key is preconfigured or allocated to the verifying party and the verified party before the identity authentication is performed, correspondingly, the identity authentication keys calculated by the verifying party and the verified party according to the pre-shared key are also the same.

When the verified party is the REQ and the verifying party is the AAC, and after the AAC receives REQAuth from the REQ, the AAC uses the identity authentication key (IAK) and the specified content to check $MIC_{REQ}$ in REQAuth, and obtains a check result. The specified content herein is the same as the specified content used by the REQ to calculate $MIC_{REQ}$.

If the specified content used by the REQ to calculate $MIC_{REQ}$ includes the first key K the AAC performs key exchange calculation first according to the temporary private key corresponding to the key exchange parameter KeyInfo$_{AAC}$ of the AAC and the temporary public key recovered from the key exchange parameter KeyInfo$_{REQ}$ of the REQ to obtain the first key K, and uses IAK and information including K to check $MIC_{REQ}$.

If the specified content used by the REQ to calculate $MIC_{REQ}$ includes the first key K and $ID_{REQ}$, the AAC uses IAK and information including K generated by the AAC and $ID_{REQ}$ to check $MIC_{REQ}$.

When the verified party is the AAC and the verifying party is the REQ, and after the REQ receives AACAuth from the AAC, the REQ uses the identity authentication key (IAK) and the specified content to check $MIC_{AAC}$ in AACAuth, and obtains a check result. The specified content herein is the same as the specified content used by the AAC to calculate $MIC_{AAC}$.

If the specified content used by the AAC to calculate $MIC_{AAC}$ includes the first key K, the REQ performs key exchange calculation first according to the temporary private key corresponding to the key exchange parameter KeyInfo$_{REQ}$ of the REQ and the temporary public key recovered from the key exchange parameter KeyInfo$_{AAC}$ of the AAC to obtain the first key K, and uses IAK and information including the first key K to check $MIC_{AAC}$.

If the specified content used by the AAC to calculate $MIC_{AAC}$ includes the first key K and $ID_{AAC}$, the REQ uses IAK and information including the first key K generated by the REQ and $ID_{AAC}$ to check $MIC_{AAC}$.

At S103, the verifying party determines an identity authentication result of the verified party according to the check result.

After the verifying party checks the identity authentication code sent by the verified party, if the check result indicates a success, it is indicated that the specified content and the pre-shared key used by the verifying party to calculate the identity authentication code are consistent with the specified content and the pre-shared key used by the verified party to calculate the identity authentication code, and correspondingly, the verifying party can determine that the identity authentication result of the verified party indicates that the verified party is legal. If the check result indicates a failure, a processing manner is as follows according to a local policy: discarding the identity authentication request message of the verified party, or determining that the identity authentication result of the verified party indicates that the verified party is not legal, or the like.

When the verified party is the REQ and the verifying party is the AAC, the AAC checks $MIC_{REQ}$ sent by the REQ, and if the check is successful, it is determined that the identity of the REQ is legal. If the check is not successful, a processing manner is as follows according to a local policy: discarding the identity authentication request message of the REQ, or determining that the REQ is not legal, or the like.

When the verified party is the AAC and the verifying party is the REQ, the REQ checks $MIC_{AAC}$ sent by the AAC, and if the check is successful it is determined that the identity of the AAC is legal. If the check is not successful, a processing manner is as follows according to a local policy: discarding the identity authentication request message of the AAC, or determining that the AAC is not legal, or the like.

Optionally, in a scenario in which the mutual identity authentication is performed between the REQ and the AAC, if the REQ and AAC mutually verify that the identity of each other is legal, the REQ and the AAC may further use a calculated new shared key as a pre-shared key (PSK) used in a next identity authentication process. That is, each of the REQ and the AAC uses the key derivation algorithm to calculate a shared key according to information including the first key K and the identity authentication key (IAK), and use the calculated shared key as a pre-shared key (PSK) used in a next identity authentication process.

No matter whether in a scenario in which the mutual identity authentication is performed between the REQ and the AAC, or in a scenario in which unilateral identity authentication is performed on the REQ, or in a scenario in which unilateral identity authentication is performed on the AAC, when the verifying party determines that the identity of the verified party is legal, the REQ and the AAC can use a calculated session key to perform subsequent secure communication.

For example, each of the REQ and the AAC calculates a session key according to information including the first key K and the identifiers of the REQ and the AAC. Exemplarily, each of the REQ and the AAC uses the key derivation algorithm to calculate a session key according to the first key K calculated thereby, $ID_{AAC}$, $ID_{REQ}$ and other information (the other information used by the REQ and used by the AAC is the same, and optional, such as a particular string, etc.), and use the same for subsequent secure communication. The session key includes a data encryption key and/or a data integrity check key.

When the AAC calculates a session key in the above manner, the AAC may use the key derivation algorithm to derive a string of key data. The key data can be used as a data encryption key and/or a data integrity check key. Alternatively, some of the key data is used as the data encryption key, and the rest is used as the data integrity check key. The AAC may also use the key derivation algorithm to derive two identical or different strings of key data separately. One string of key data is used as the data encryption key, and the other string of key data is used as the data integrity check key. When the REQ calculates a session key in the above manner, the REQ may use the key derivation algorithm to derive a string of key data. The key data can be used as a data encryption key and/or a data integrity check key. Alternatively, some of the key data is used as the data encryption key, and the rest is used as the data integrity check key. The REQ may also use the key derivation algorithm to derive two identical or different strings of key data separately. One string of key data is used as the data encryption key, and the other string of key data is used as the data integrity check key.

It can be seen from the above technical solution that in the identity authentication method provided in the embodiment of the present disclosure, mutual or unilateral identity authentication is performed between an authentication access controller and a requester by using a pre-shared key, to lay the foundation for ensuring that a user accessing a network is legal and/or a network accessed by a user is legal, so as to achieve secure communication between the requester and the authentication access controller. In addition, in an identity authentication process, a verified party performs calculation on information including a pre-shared key of the two parties to obtain an identity authentication key, and uses the identity authentication key to perform calculation on specified content to obtain an identity authentication code of the verified party. Such an identity authentication code calculation manner provided in the embodiment of the present disclosure incorporates key exchange calculation, which enhances the capability of the authentication process against the dictionary brute force attacks or quantum computation attacks is enhanced through the ingenious detail design.

Alternatively, the identity authentication key used by the verified party to generate the identity authentication code and the identity authentication key used by the verifying party to verify the identity authentication code are respectively obtained by the verified party and the verifying party by performing calculation on calculation information including the pre-shared key between the verifying party and the verified party, and the calculation information may further include a nonce generated by the verifying party and a nonce generated by the verified party respectively.

Figure 2:
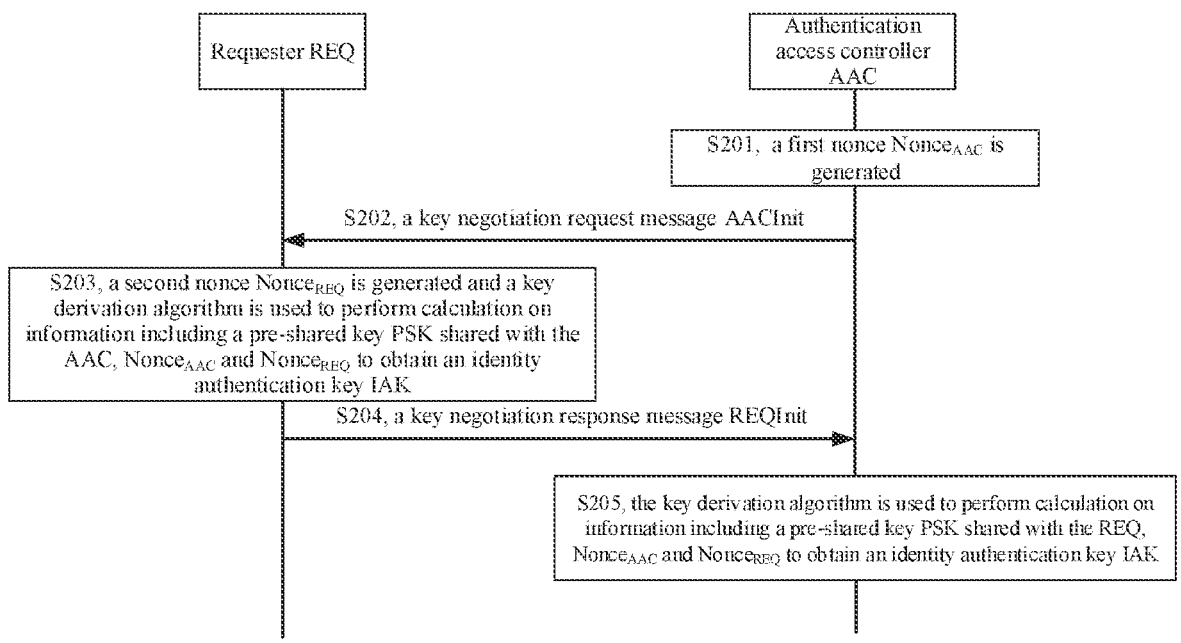
FIG. 2 is a schematic diagram of a method used by a requester (REQ) and an authentication access controller (AAC) to calculate an identity authentication key according to an embodiment of the present disclosure.

A method used by an REQ and an AAC to calculate an identity authentication key will be described below with reference to FIG. 2. Referring to FIG. 2, the method includes the following operations.

At S201, an AAC generates a first nonce $Nonce_{AAC}$.

At S202, the AAC sends a key negotiation request message AACInit to an REQ.

The AAC adds $Nonce_{AAC}$ to AACInit to send the same to the REQ, so that the REQ uses information including a pre-shared key (PSK) shared with the AAC, $Nonce_{AAC}$, and a second nonce $Nonce_{REQ}$ generated by the REQ to calculate an identity authentication key (IAK).

Optionally, the AAC may add security capability parameter information Security capabilities$_{AAC}$ supported by the AAC to AACInit to send to the REQ. The Security capabilities$_{AAC}$ includes one or more identity authentication suites (each of the identity authentication suites includes one or more identity authentication methods), one or more symmetric encryption algorithms, one or more integrity check algorithms, one or more hash algorithms, one or more key exchange algorithms, and/or one or more key derivation algorithms etc., that are supported by the AAC, so that the REQ selects and uses a particular security policy (Security capabilities$_{REQ}$).

Optionally, the AAC may add an identifier $ID_{AAC}$ of the AAC to AACInit to send the same to the REQ, so that the REQ determines a pre-shared key (PSK) shared with the AAC according to $ID_{AAC}$. It should be noted that if the REQ learns the identifier of the AAC in advance, the AAC does not need to transmit $ID_{AAC}$.

At S203, the REQ generates a second nonce $Nonce_{REQ}$, and uses a key derivation algorithm to perform calculation on information including a pre-shared key (PSK) shared with the AAC, $Nonce_{AAC}$ and $Nonce_{REQ}$ to obtain an identity authentication key (IAK).

Upon receiving AACInit, the REQ generates the second nonce $Nonce_{REQ}$, and uses PSK shared with the AAC, $Nonce_{AAC}$, $Nonce_{REQ}$, and other information (the other information used by the REQ and used by the AAC is the same, and optional, such as a particular string, etc.) and the key derivation algorithm to calculate the identity authentication key (IAK).

If AACInit received by the REQ further includes security capabilities$_{AAC}$, the REQ may select, according to the security capabilities$_{AAC}$, a particular security policy Security capabilities$_{REQ}$ used by the REQ. The Security capabilities$_{REQ}$ includes: an identity authentication method, a symmetric encryption algorithm an integrity check algorithm, a hash algorithm, a key exchange algorithm, and/or a key derivation algorithm etc., that are determined and used by the REQ.

At S204, the REQ sends a key negotiation response message REQInit to the AAC.

REQInit includes $Nonce_{REQ}$, so that the AAC uses information including a pre-shared key (PSK) shared with the REQ, $Nonce_{AAC}$ generated by the AAC, and $Nonce_{REQ}$ to calculate an identity authentication key (IAK).

If AACInit received by the REQ further includes the security capabilities$_{AAC}$, then the REQ adds Security capabilities$_{REQ}$, to REQInit to send the same to the AAC.

Optionally, if AACInit received by the REQ further includes $ID_{AAC}$, the REQ may add an identifier $ID_{REQ}$ of the REQ to REQInit, so that the AAC determines the pre-shared key (PSK) shared with the REQ according to $ID_{REQ}$. It should be noted that if the AAC learns the identifier of the REQ in advance, the REQ does not need to transmit $ID_{REQ}$.

At S205, the AAC uses the key derivation algorithm to perform calculation on information including a pre-shared key (PSK) shared with the REQ, $Nonce_{AAC}$ and $Nonce_{REQ}$ to obtain an identity authentication key (IAK).

Upon receiving REQInit, the AAC uses PSK shared with the REQ, $Nonce_{AAC}$, $Nonce_{REQ}$, and other information (other information used by the AAC and used by the REQ is the same and optional, such as a particular string, etc.) and the key derivation algorithm to calculate the identity authentication key (IAK).

Optionally, REQInit in S204 may further include $Nonce_{AAC}$, so that before calculating IAK, the AAC may first verify consistency between $Nonce_{AAC}$ in REQInit and $Nonce_{AAC}$ generated by the AAC. If $Nonce_{AAC}$ in REQInit is consistent with $Nonce_{AAC}$ generated by the AAC, the AAC calculates IAK; otherwise, the AAC discards REQInit.

On the basis of the above embodiment, the identity authentication method provided in the embodiments of the present disclosure will be described below for application scenarios of mutual identity authentication and unilateral identity authentication. For the case of unilateral identity authentication, two implementation manners, i.e., unilateral authentication of a REQ and unilateral authentication of an AAC, are further provided.

Figure 3:
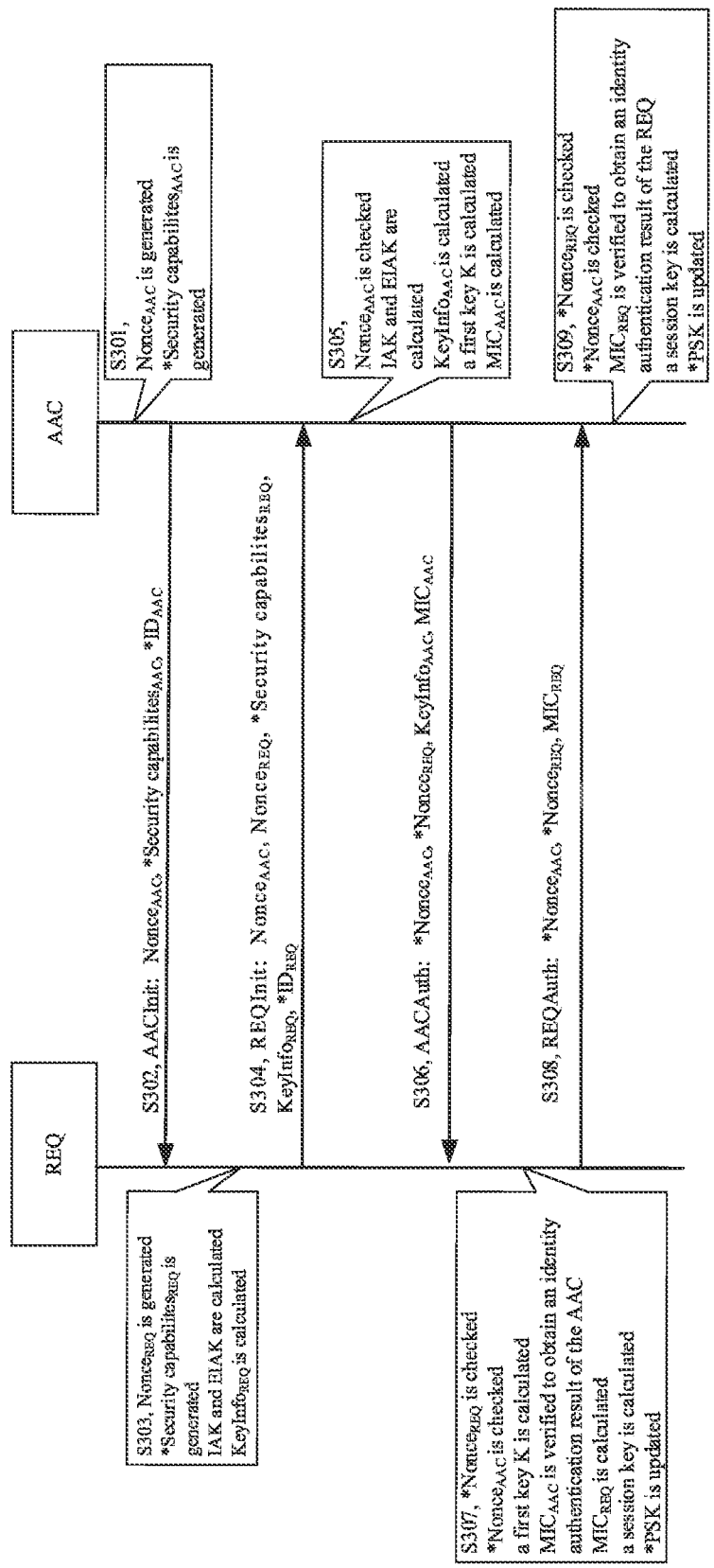
FIG. 3 is a schematic diagram of a mutual identity authentication method according to an embodiment of the present disclosure, where "*" represents an optional field or an optional operation.

FIG. 3 is an embodiment of an identity authentication method in the case of mutual identity authentication, with reference to FIG. 3, the method includes following operations.

At S301, an AAC generates $Nonce_{AAC}$, and security capabilities$_{AAC}$ as required.

At S302, the AAC sends a key negotiation request message AACInit to an REQ.

AACInit includes $Nonce_{AAC}$, security capabilities$_{AAC}$ and $ID_{AAC}$. The Security capabilities$_{AAC}$ and $ID_{AAC}$ are both optional fields. The Security capabilities$_{AAC}$ represents security capability parameter information supported by the AAC, and includes: one or more identity authentication suites, one or more symmetric encryption algorithms, one or more integrity check algorithms, one or more hash algorithms, and/or one or more key derivation algorithms etc., which are supported by the AAC (hereinafter the same). $ID_{AAC}$ represents an identifier of the AAC.

At S303, the REQ generates $Nonce_{REQ}$ and Security capabilities$_{REQ}$ as required, determines a pre-shared key (PSK) shared with the AAC according to the obtained $ID_{AAC}$, and uses a key derivation algorithm to calculate an identity authentication key (IAK) according to PSK, $Nonce_{AAC}$, $Nonce_{REQ}$, and other information (the other information used by the REQ and used by the AAC is the same, and optional, such as a particular string, etc.), uses a key derivation algorithm to calculate an extended identity authentication key (EIAK) according to IAK and other information (the other information used by the AAC and used by the REQ is the same, and optional, such as a particular string, etc.), and then calculates $KeyInfo_{REQ}$. $Nonce_{AAC}$ shall be equal to a corresponding field in AACInit.

At S304, the REQ sends a key negotiation response message REQInit to the AAC.

REQInit includes $Nonce_{AAC}$, $Nonce_{REQ}$, Security capabilities$_{REQ}$, $KeyInfo_{REQ}$, and $ID_{REQ}$. $Nonce_{AAC}$ shall be equal to $Nonce_{AAC}$ in AACInit. Security capabilities$_{REQ}$ is an optional field. When and only when Security capabilities$_{AAC}$ is present in AACInit, Security capabilities$_{REQ}$ is present, Security capabilities$_{REQ}$ represents selection of a particular security policy made by the REQ according to Security capabilities$_{AAC}$, i.e., an identity authentication method, a symmetric encryption algorithm, an integrity check algorithm, a hash algorithm, and/or a key derivation algorithm, etc., that are determined and used by the REQ (hereinafter the same). $KeyInfo_{REQ}$ is a result of performing an XOR operation on information including a temporary public key generated by the REQ and the extended identity authentication key (EIAK). EIAK is calculated by the REQ by using the key derivation algorithm according to IAK and other information (other information used by the AAC and used by the REQ is the same, and optional, such as a particular string, etc.). $ID_{REQ}$ is an optional field. When and only when $ID_{AAC}$ is present in AACInit, $ID_{REQ}$ is present.

At S305, upon receiving REQInit, the AAC performs the following operations (unless otherwise specified or if not due to a logical relationship, the following actions numbered (1), (2), . . . do not have a necessary order due to the numbers, which is the case hereinbefore and hereinafter).

(1) It is checked whether $Nonce_{AAC}$ in REQInit is the same as $Nonce_{AAC}$ generated by the AAC, and if not, discarding REQInit.

(2) A pre-shared key (PSK) shared with the REQ is determined according to the obtained $ID_{REQ}$, and a key derivation algorithm is used to calculate an identity authentication key (IAK) according to PSK, $Nonce_{AAC}$, $Nonce_{REQ}$, and other information (the other information used by the AAC and used by the REQ is the same, and optional, such as a particular string, etc.).

(3) A key derivation algorithm is used to calculate an extended identity authentication key (EIAK) according to IAK and other information (the other information used by the AAC and used by the REQ is the same, and optional, such as a particular string, etc.).

(4) $KeyInfo_{AAC}$ is calculated.

(5) Key exchange calculation is performed according to a temporary private key corresponding to $KeyInfo_{AAC}$ and a temporary public key recovered from $KeyInfo_{REQ}$ to obtain a first key K.

(6) IAK and an integrity check algorithm are used to calculate an identity authentication code $MIC_{AAC}$ of the AAC.

At S306, the AAC sends an identity authentication request message AACAuth of the AAC to the REQ.

AACAuth includes $Nonce_{AAC}$, $Nonce_{REQ}$, $KeyInfo_{AAC}$, and $MIC_{AAC}$. $Nonce_{REQ}$ and $Nonce_{AAC}$ are optional fields, and shall be respectively equal to $Nonce_{REQ}$ in REQInit and $Nonce_{AAC}$ generated by the AAC. $KeyInfo_{AAC}$ is a result of performing an XOR operation on information including a temporary public key generated by the AAC and the extended identity authentication key (EIAK). $MIC_{AAC}$ is calculated by the AAC by using IAK and the integrity check algorithm to perform calculation on calculation data including the first key K and $ID_{AAC}$. In the embodiments of the present disclosure, a calculation object used in an algorithm operation is referred to as the calculation data.

At S307, upon receiving AACAuth, the REQ performs the following operations.

(1) If AACAuth carries $Nonce_{REQ}$ and/or $Nonce_{AAC}$, checking whether $Nonce_{REQ}$ is the same as $Nonce_{REQ}$ generated by the REQ, and/or checking whether $Nonce_{AAC}$ is the same as $Nonce_{AAC}$ in AACInit.

(2) Key exchange calculation is performed according to a temporary private key corresponding to $KeyInfo_{REQ}$ and a temporary public key recovered from $KeyInfo_{AAC}$ to obtain a first key K.

(3) $MIC_{AAC}$ is verified to obtain an identity authentication result of the AAC.

For example, the REQ uses the identity authentication key (IAK) and the integrity check algorithm to perform local calculation on specified content including the first key K and $ID_{AAC}$ to obtain $MIC_{AAC}$ (the calculation manner is the same as a manner in which the AAC calculates $MIC_{AAC}$), and performs comparison to determine whether the calculated $MIC_{AAC}$ is consistent with $MIC_{AAC}$ in AACAuth.

(4) If one of the checking or verification operations is not successful, AACAuth is immediately discarded. If the checking and verification operations are successful, authentication on the AAC is completed to obtain the identity authentication result of the AAC, i.e., the AAC is determined to be legal.

(5) The identity authentication key (IAK) and the integrity check algorithm are used to calculate an identity authentication code $MIC_{REQ}$ of the REQ; and (6) A session key is calculated, and PSK is updated as required.

Exemplarily, the REQ uses the key derivation algorithm to calculate a session key according to the first key K, $Nonce_{AAC}$, $Nonce_{REQ}$, $ID_{AAC}$, $ID_{REQ}$, and other information (the other information used by the REQ and used by the AAC is the same, and optional, such as a particular string, etc.), so as to ensure the subsequent secure communication between the REQ and the AAC. The session key may include a data encryption key and/or a data integrity check key. $Nonce_{AAC}$ and $ID_{AAC}$ shall be equal to corresponding fields in AACInit. $Nonce_{REQ}$ and $ID_{REQ}$ shall be respectively equal to $Nonce_{REQ}$ generated by the REQ and the identifier $ID_{REQ}$ of the REQ. Optionally the REQ uses the key derivation algorithm to calculate, according to the first key K and information including the identity authentication key (AK), PSK used in a next identity authentication process.

At S308, the REQ sends an identity authentication request message REQAuth of the REQ to the AAC.

REQAuth includes $Nonce_{AAC}$, $Nonce_{REQ}$, and $MIC_{REQ}$. $Nonce_{REQ}$ and $Nonce_{AAC}$ are optional fields, and shall be respectively equal to $Nonce_{REQ}$ generated by the REQ and $Nonce_{AAC}$ in AACInit. $MIC_{REQ}$ is obtained by the REQ by using the identity authentication key (IAK) and the integrity check algorithm to perform calculation on calculation data. The calculation data of $MIC_{REQ}$ includes the first key K and $ID_{REQ}$.

At S309, upon receiving REQAuth, the AAC performs the following operations.

(1) If REQAuth carries $Nonce_{REQ}$ and/or $Nonce_{AAC}$, it is checked whether $Nonce_{REQ}$ is the same as $Nonce_{REQ}$ in REQInit, and/or it is checked whether $Nonce_{AAC}$ is the same as $Nonce_{AAC}$ generated by the AAC.

(2) $MIC_{REQ}$ is verified to obtain an identity authentication result of the REQ.

For example, the AAC uses the identity authentication key (IAK) and the integrity check algorithm to perform local calculation on the specified content including the first key K and $ID_{REQ}$ to obtain $MIC_{REQ}$ (the calculation manner is the same as a manner in which the REQ calculates $MIC_{REQ}$), and performs comparison to determine whether calculated $MIC_{REQ}$ is consistent with $MIC_{REQ}$ in REQAuth.

(3) If one of the checking or verification operations is not successful, REQAuth is immediately discarded. If the checking and verification operations are successful, authentication on the REQ is completed to obtain the identity authentication result of the REQ, that is, determining that the REQ is legal.

(4) A session key is calculated, and PSK is updated as required.

Exemplarily, the AAC uses the key derivation algorithm to calculate a session key according to the first key K, $Nonce_{AAC}$, $Nonce_{REQ}$, $ID_{AAC}$, $ID_{REQ}$, and other information (the other information used by the AAC and used by the REQ is the same, and optional, such as a particular string, etc.), so as to ensure the subsequent secure communication between the AAC and the REQ. The session key may include a data encryption key and/or a data integrity check key. $Nonce_{AAC}$ and $ID_{AAC}$ shall be respectively equal to $Nonce_{AAC}$ generated by the AAC and the identifier $ID_{AAC}$ of the AAC. $Nonce_{REQ}$ and $ID_{REQ}$ shall be respectively equal to corresponding fields in REQInit. Optionally, the AAC uses the key derivation algorithm to calculate, according to the first key K and information including the identity authentication key (IAK), PSK used in a next identity authentication process.

Therefore, the identity authentication on the AAC and the identity authentication on the REQ are respectively performed at S307 and S309. That is, mutual identity authentication of the REQ and the AAC is achieved.

Figure 4:
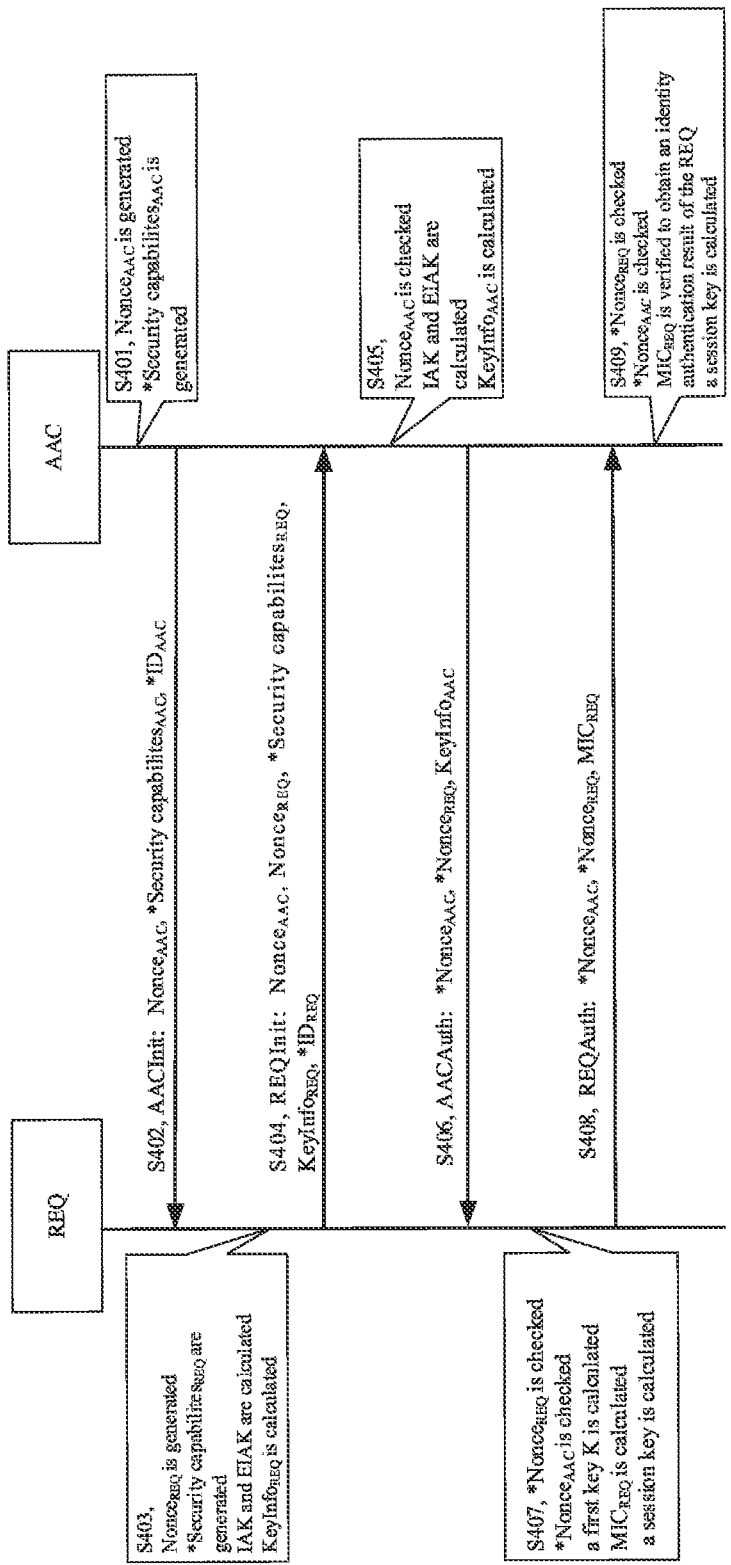
FIG. 4 is a schematic diagram of a unilateral identity authentication method according to an embodiment of the present disclosure, where "*" represents an optional field or an optional operation.

FIG. 4 is an embodiment of an identity authentication method in the case of unilateral authentication on a REQ. With reference to FIG. 4, the method includes following operations.

At S401, an AAC generates $Nonce_{AAC}$ generates Security $capabilities_{AAC}$ as required.

At S402, the AAC sends a key negotiation request message AACInit to a REQ.

AACInit includes $Nonce_{AAC}$, Security $capabilities_{AAC}$, and $ID_{AAC}$. Security $capabilities_{AAC}$ and $ID_{AAC}$ are both optional fields.

At S403, the REQ generates $Nonce_{REQ}$, generates Security $capabilities_{REQ}$ as required, determines a pre-shared key (PSK) shared with the AAC according to obtained $ID_{AAC}$, and uses a key derivation algorithm to calculate an identity authentication key (IAK) according to PSK, $Nonce_{AAC}$, $Nonce_{REQ}$ and other information (the other information used by the REQ and used by the AAC is the same, and optional, such as a particular string, etc.), uses a key derivation algorithm to calculate an extended identity authentication key (EIAK) according to IAK and other information (the other information used by the AAC and used by the REQ is the same, and optional, such as a particular string, etc.), and then calculates $KeyInfo_{REQ}$. $Nonce_{AAC}$ shall be equal to a corresponding field in AACInit.

At S404, the REQ sends a key negotiation response message REQInit to the AAC.

REQInit includes $Nonce_{AAC}$, $Nonce_{REQ}$, Security $capabilities_{REQ}$, $KeyInfo_{REQ}$, and $ID_{REQ}$. $Nonce_{AAC}$ shall be equal to $Nonce_{AAC}$ in AACInit. Security $capabilities_{REQ}$ is an optional field. When and only when Security $capabilities_{AAC}$ is present in AACInit, Security $capabilities_{REQ}$ is present. $KeyInfo_{REQ}$ is a result of performing an XOR operation on information including a temporary public key generated by the REQ and the extended identity authentication key (EIAK). EIAK is calculated by the REQ by using the key derivation algorithm according to IAK and other information (the other information used by the AAC and used by the REQ is the same, and optional, such as a particular string, etc.). $ID_{REQ}$ is an optional field. When and only when $ID_{AAC}$ is present in AACInit, $ID_{REQ}$ is present.

At S405, upon receiving REQInit, the AAC performs the following operations.

(1) It is checked whether $Nonce_{AAC}$ in REQInit is the same as $Nonce_{AAC}$ generated by the AAC, and if not, REQInit is discarded.

(2) A pre-shared key (PSK) shard with the REQ is determined according to the obtained $ID_{REQ}$, and a key derivation algorithm is used to calculate an identity authentication key (IAK) according to PSK, $Nonce_{AAC}$, $Nonce_{REQ}$, and other information (the other information used by the AAC and used by the REQ is the same, and optional, such as a particular string, etc.).

(3) A key derivation algorithm is used to calculate an extended identity authentication key (EIAK) according to IAK and other information (the other information used by the AAC and used by the REQ is the same, and optional, such as a particular string, etc.).

(4) $KeyInfo_{AAC}$ is calculated.

At S406, the AAC sends AACAuth to the REQ.

AACAuth includes $Nonce_{AAC}$, $Nonce_{REQ}$, and $KeyInfo_{AAC}$. $Nonce_{REQ}$ and $Nonce_{AAC}$ are optional fields, and shall be respectively equal to $Nonce_{REQ}$ in REQInit and $Nonce_{AAC}$ generated by the AAC. $KeyInfo_{AAC}$ is a result of performing an XOR operation on information including a temporary public key generated by the AAC and the extended identity authentication key (EIAK).

At S407, upon receiving AACAuth, the REQ performs the following operations.

(1) If AACAuth carries $Nonce_{REQ}$ and/or $Nonce_{AAC}$, it is checked whether $Nonce_{REQ}$ is the same as $Nonce_{REQ}$ generated by the REQ, and/or it is checked whether $Nonce_{AAC}$ is the same as $Nonce_{AAC}$ in AACInit; and if not, discarding AACAuth.

(2) Key exchange calculation is performed according to a temporary private key corresponding to $KeyInfo_{REQ}$ and a temporary public key recovered from $KeyInfo_{AAC}$ to obtain a first key K.

(3) The identity authentication key (IAK) and the integrity check algorithm are used to calculate an identity authentication code $MIC_{REQ}$ of the REQ.

(4) A session key is calculated.

Exemplarily, the REQ uses the key derivation algorithm to calculate a session key according to the first key K, $Nonce_{AAC}$, $Nonce_{REQ}$, $ID_{AAC}$, $ID_{REQ}$, and other information (the other information used by the REQ and used by the AAC is the same, and optional, such as a particular string, etc.), and so as to ensure the subsequent secure communication between the REQ and the AAC. The session key may include a data encryption key and/or a data integrity check key. $Nonce_{REQ}$ and $ID_{REQ}$ shall be respectively equal to $Nonce_{REQ}$ generated by the REQ and the identifier $ID_{REQ}$ of the REQ. $Nonce_{AAC}$ and $ID_{AAC}$ shall be respectively equal to corresponding fields in AACInit.

At S408, the REQ sends an identity authentication request message REQAuth of the REQ to the AAC.

REQAuth includes $Nonce_{AAC}$, $Nonce_{REQ}$, and $MIC_{REQ}$. $Nonce_{REQ}$ and $Nonce_{AAC}$ are optional fields, and shall be respectively equal to $Nonce_{REQ}$ generated by the REQ and $Nonce_{AAC}$ in AACInit. $MIC_{REQ}$ is obtained by the REQ by using the identity authentication key (IAK) and the integrity check algorithm to perform calculation on calculation data. The calculation data of $MIC_{REQ}$ includes the first key K, $ID_{REQ}$, and $ID_{AAC}$.

At S409, upon receiving REQAuth, the AAC performs the following operations.

(1) If REQAuth carries $Nonce_{REQ}$ and/or $Nonce_{AAC}$, it is checked whether $Nonce_{REQ}$ is the same as $Nonce_{REQ}$ in REQInit, and/or it is checked whether $Nonce_{AAC}$ is the same as $Nonce_{AAC}$ generated by the AAC.

(2) $MIC_{REQ}$ is verified to obtain an identity authentication result of the REQ.

For example, the AAC uses the identity authentication key (IAK) and the integrity check algorithm to perform local calculation on the specified content including the first key K, $ID_{REQ}$, and $ID_{AAC}$ to obtain $MIC_{REQ}$, and performs comparison to determine whether calculated $MIC_{REQ}$ is consistent with $MIC_{REQ}$ in REQAuth.

(3) If one of the checking or verification operations is not successful, REQAuth is immediately discarded. If the checking and verification operations are successful, authentication on the REQ is completed to obtain the identity authentication result of the REQ, that is, determining that the REQ is legal.

(4) A session key is calculated.

Exemplarily, the AAC uses the key derivation algorithm to calculate a session key according to the first key K, $Nonce_{AAC}$, $Nonce_{REQ}$, $ID_{AAC}$, $ID_{REQ}$, and other information (other information used by the AAC and used by the REQ is the same, and optional, such as a particular string, etc.), so as to ensure the subsequent secure communication between the AAC and the REQ. The session key may include a data encryption key and/or a data integrity check key. $Nonce_{AAC}$ and $ID_{AAC}$ shall be respectively equal to $Nonce_{AAC}$ generated by the AAC and the identifier $ID_{AAC}$ of the AAC. $Nonce_{REQ}$ and $ID_{REQ}$ shall be respectively equal to corresponding fields in REQInit.

Therefore, the identity authentication on the REQ is performed at S409. That is, unilateral identity authentication on the REQ is achieved.

Figure 5:
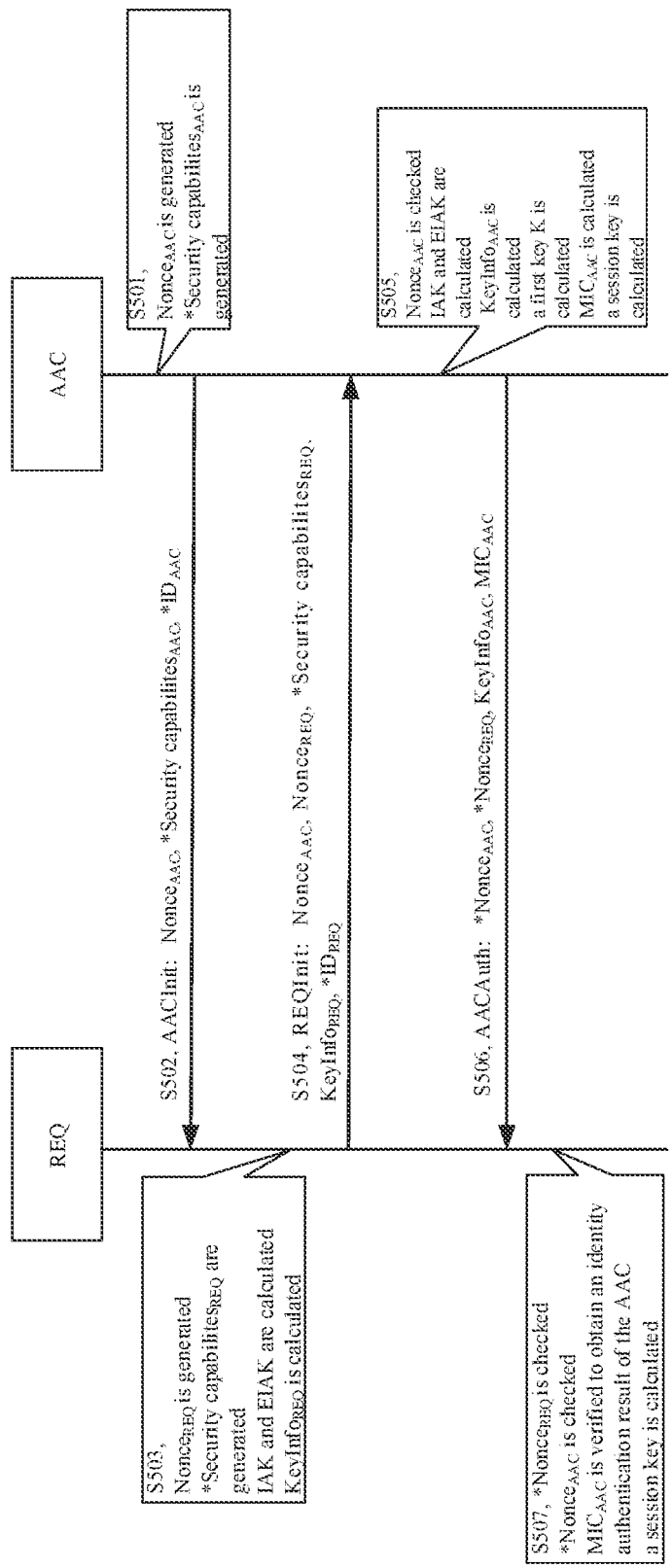
FIG. 5 is a schematic diagram of another unilateral identity authentication method according to an embodiment of the present disclosure, where "*" represents an optional field or an optional operation.

FIG. 5 is an embodiment of an identity authentication method in the case of unilateral authentication on an AAC. With reference to FIG. 5, the method includes following operations.

At S501, an AAC generates $Nonce_{AAC}$, and generates Security capabilities$_{AAC}$ as required.

At S502, the AAC sends a key negotiation request message AACInit to a REQ.

AACInit includes $Nonce_{AAC}$, Security capabilities$_{AAC}$, and $ID_{AAC}$. Security capabilities$_{AAC}$ and $ID_{AAC}$ are both optional fields.

At S503, the REQ generates $Nonce_{REQ}$, generates Security capabilities$_{RE}$ as required, determines a pre-shared key (PSK) with the AAC according to obtained $ID_{AAC}$, and uses a key derivation algorithm to calculate an identity authentication key (IAK) according to PSK, $Nonce_{AAC}$, $Nonce_{REQ}$, and other information (the other information used by the REQ and used by the AAC is the same, and optional, such as a particular string, etc.), uses a key derivation algorithm to calculate an extended identity authentication key (EIAK) according to IAK and other information (the other information used by the AAC and used by the REQ is the same, and optional, such as a particular string, etc.), and then calculates KeyInfo$_{REQ}$. $Nonce_{AAC}$ shall be equal to a corresponding field in AACInit.

At S504, the REQ sends a key negotiation response message REQInit to the AAC.

REQInit includes $Nonce_{AAC}$, $Nonce_{REQ}$, Security capabilities$_{REQ}$, KeyInfo$_{REQ}$, and $ID_{REQ}$. $Nonce_{AAC}$ shall be equal to $Nonce_{AAC}$ in AACInit. Security capabilities$_{REQ}$ is an optional field. When and only when Security capabilities$_{AAC}$ is present in AACInit, Security capabilities$_{REQ}$ is present. KeyInfo$_{REQ}$ is a result of performing an XOR operation on information including a temporary public key generated by the REQ and the extended identity authentication key (EIAK), EIAK is calculated by the REQ by using the key derivation algorithm according to IAK and other information (the other information used by the AAC and used by the REQ is the same, and optional, such as a particular string, etc.). $ID_{REQ}$ is an optional field. When and only when $ID_{AAC}$ is present in AACInit, $ID_{REQ}$ is present.

At S505, upon receiving REQInit, the AAC performs the following operations.

(1) It is checked whether $Nonce_{AAC}$ in REQInit is the same as $Nonce_{AAC}$ generated by the AAC, and if not, REQInit is discarded.

(2) A pre-shared key (PSK) shared with the REQ is determined according to the obtained $ID_{REQ}$, and a key derivation algorithm is used to calculate an identity authentication key (IAK) according to PSK, $Nonce_{AAC}$, $Nonce_{REQ}$, and other information (the other information used by the AAC and used by the REQ is the same, and optional, such as a particular string, etc.).

(3) A key derivation algorithm is used to calculate an extended identity authentication key (EIAK) according to IAK and other information (the other information used by the AAC and used by the REQ is the same, and optional, such as a particular string, etc.).

(4) KeyInfo$_{AAC}$ is calculated.

(5) Key exchange calculation is performed according to a temporary private key corresponding to KeyInfo$_{AAC}$ and a temporary public key recovered from KeyInfo$_{REQ}$ to obtain a first key K.

(6) IAK and an integrity check algorithm are used to calculate an identity authentication code $MIC_{AAC}$ of the AAC.

(7) A session key is calculated.

Exemplarily, the AAC uses the key derivation algorithm to calculate a session key according to the first key K, $Nonce_{AAC}$, $Nonce_{REQ}$, $ID_{AAC}$, $ID_{REQ}$, and other information (the other information used by the AAC and used by the REQ is the same, and optional, such as a particular string, etc.), and so as to ensure the subsequent secure communication between the REQ and the AAC. The session key may include a data encryption key and/or a data integrity check key. $Nonce_{AAC}$ and $ID_{AAC}$ shall be respectively equal to $Nonce_{AAC}$ generated by the AAC and the identifier $ID_{AAC}$ of the AAC. $Nonce_{REQ}$ and $ID_{REQ}$ shall be respectively equal to corresponding fields in REQInit.

At S506, the AAC sends an identity authentication request message AACAuth of the AAC to the REQ.

AACAuth includes $Nonce_{AAC}$, $Nonce_{REQ}$, $KeyInfo_{AAC}$, and $MIC_{AAC}$. $Nonce_{REQ}$ and $Nonce_{AAC}$ are optional fields, and shall be respectively equal to $Nonce_{REQ}$ in REQInit and $Nonce_{AAC}$ generated by the AAC. $KeyInfo_{AAC}$ is a result of performing an XOR operation on information including a temporary public key generated by the AAC and the extended identity authentication key (EIAK). $MIC_{AAC}$ is calculated by the AAC by using the identity authentication key (IAK) and the integrity check algorithm to perform calculation on calculation data. The calculation data of $MIC_{AAC}$ includes the first key K, $ID_{REQ}$, and $ID_{AAC}$.

At S507, upon receiving AACAuth, the REQ performs the following operations.

(1) If AACAuth carries $Nonce_{REQ}$ and/or $Nonce_{AAC}$, it is checked whether $Nonce_{REQ}$ is the same as $Nonce_{REQ}$ generated by the REQ, and/or it is checked whether $Nonce_{AAC}$ is the same as $Nonce_{AAC}$ in AACInit.

(2) $MIC_{AAC}$ is verified to obtain an identity authentication result of the AAC.

For example, the REQ uses the identity authentication key (IAK) and the integrity check algorithm to perform local calculation on the specified content including the first key K, $ID_{REQ}$, and $ID_{AAC}$ to obtain $MIC_{AAC}$, and performs comparison to determine whether calculated $MIC_{AAC}$ is consistent with $MIC_{REQ}$ in AACAuth.

(3) If one of the checking or verification operations is not successful, AACAuth is immediately discarded. If the checking and verification operations are successful, authentication on the AAC is completed to obtain the identity authentication result of the AAC, that is, it is determined that the AAC is legal.

(4) A session key is calculated.

Exemplarily, the REQ uses the key derivation algorithm to calculate a session key according to the first key K, $Nonce_{AAC}$, $Nonce_{REQ}$, $ID_{AAC}$, $ID_{REQ}$, and other information (other information used by the REQ and used by the AAC is the same, and optional, such as a particular string, etc.), so as to ensure the subsequent secure communication between the REQ and the AAC. The session key may include a data encryption key and/or a data integrity check key. $Nonce_{AAC}$ and $ID_{AAC}$ shall be respectively equal to corresponding fields in AACInit. $Nonce_{REQ}$ and $ID_{REQ}$ shall be respectively equal to $Nonce_{REQ}$ generated by the REQ and the identifier $ID_{REQ}$ of the REQ.

Therefore, the identity authentication on the AAC is performed at S507. That is, unilateral identity authentication on the AAC is achieved.

In the above embodiments, each message may also carry a hash value $HASH_X$, and the hash value $HASH_X$ is obtained by a sending entity X of the message by using a hash algorithm to perform calculation on a latest preceding message received from a peer entity Y, and is used by the peer entity Y to verify whether the entity X receives the complete latest preceding message. If X represents a REQ. Y represents an AAC correspondingly. If X represents an AAC, Y represents a REQ correspondingly. $HASH_{REQ}$ represents a hash value calculated by the REQ for a latest preceding message received from the AAC, $HASH_{AAC}$ represents a hash value calculated by the AAC for a latest preceding message received from the REQ. If a message currently sent by the sending entity X is the first message interacted between the entity X and the entity Y, it is indicated that the entity X has not yet received a preceding message from the peer entity Y, then $HASH_X$ may not be present in this message, or $HASH_X$ in this message is meaningless.

Correspondingly, after the peer entity Y receives a message from the entity X, if the message includes $HASH_X$, the entity Y ignores $HASH_X$ when the entity Y has not sent any preceding message to the entity X before. When the entity Y has sent a preceding message to the entity X before, the entity Y uses a hash algorithm to locally calculate a hash value for a latest preceding message previously sent to the entity X. and compares the same with a hash value $HASH_X$ carried in the received message, and if the two hash values are consistent with each other, the entity Y performs subsequent operations, or if the two hash values are not consistent with each other, the entity Y discards the received message or ends the current authentication process.

In the present invention, for the entity X, a preceding message sent by the peer entity Y to the entity X refers to: a message sent by the peer entity Y to the entity X that is received before the entity X sends a message M to the peer entity Y, and a latest preceding message sent by the peer entity Y to the entity X refers to: a latest message sent by the peer entity Y to the entity X that is received before the entity X sends a message M to the peer entity Y. If the message M sent by the entity X to the peer entity Y thereof is the first message interacted between the entity X and the entity Y, then there is no preceding message sent by the peer entity Y to the entity X before the entity X sends the message M to the peer entity Y thereof.

It should be noted that the optional fields and optional operations in the embodiments corresponding to FIG. 3, FIG. 4 and FIG. 5 are represented by "*" in FIG. 3. FIG. 4, and FIG. 5 of the accompanying drawings of the specification. No limitation is set on the order of various contents included in the messages involved in the above embodiments, and if not specified otherwise, no limitation is set on the order of operations performed by a message receiver on relevant messages or the order of processes performed on contents included in the messages.

On the basis of the method embodiments corresponding to FIG. 1 to FIG. 5, also provided in an embodiment of the present disclosure is an authentication access controller. The authentication access controller may be used as not only a verified party but also a verifying party, and may also have functions of both a verified party and a verifying party.

Figure 6:
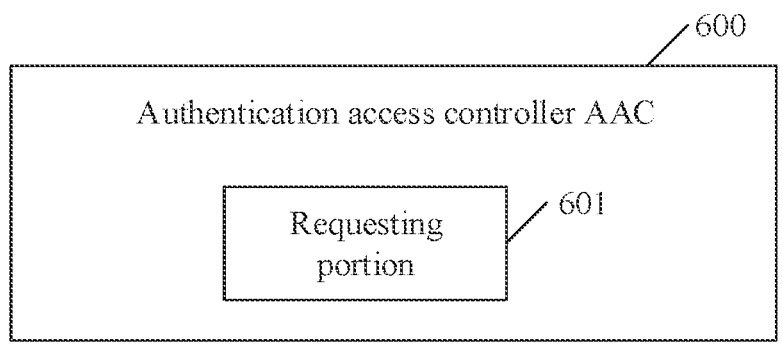
FIG. 6 is a structural block diagram of an authentication access controller (AAC) according to an embodiment of the present disclosure.

With reference to FIG. 6, an authentication access controller 600 used only as a verified party includes a requesting portion 601.

The requesting portion 601 is configured to send an identity authentication request message of the authentication access controller to a requester, the identity authentication request message of the authentication access controller includes an identity authentication code of the authentication access controller, where the identity authentication code of the authentication access controller is obtained by the authentication access controller by using an identity authentication key to perform calculation on specified content including a first key.

Figure 7:
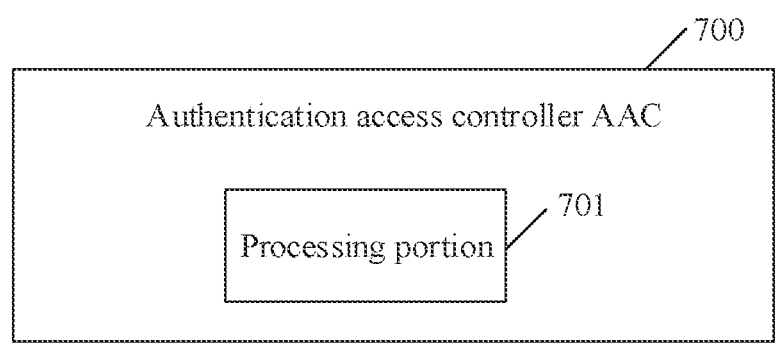
FIG. 7 is a structural block diagram of another authentication access controller (AAC) according to an embodiment of the present disclosure.

With reference to FIG. 7, an authentication access controller 700 used only as a verifying parky includes a processing portion 701.

A processing portion 701 is configured to receive an identity authentication request message of the requester from the requester, the identity authentication request message of the requester includes an identity authentication code of the requester, where the identity authentication code of the requester is obtained by the requester by using an identity authentication key to perform calculation on specified content including a first key.

The processing portion 701 is further configured to use the identity authentication key and the specified content to check the identity authentication code of the requester to obtain a check result, and determine an identity authentication result of the requester according to the check result, the identity authentication key is obtained by performing calculation on information including a pre-shared key between the requester and the authentication access controller.

Figure 8:
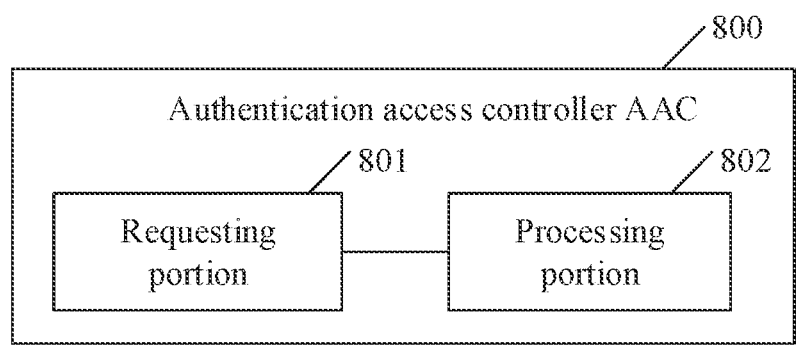
FIG. 8 is a structural block diagram of yet another authentication access controller (AAC) according to an embodiment of the present disclosure.

With reference to FIG. 8, an authentication access controller 800 having both functions of a verifying party and functions of a verified party includes a requesting portion 801 and a processing portion 802.

The requesting portion 801 is configured to send an identity authentication request message of the authentication access controller to a requester, the identity authentication request message of the authentication access controller includes an identity authentication code of the authentication access controller, the identity authentication code of the authentication access controller is obtained by the authentication access controller by using an identity authentication key to perform calculation on specified content including a first key.

The processing portion 802 is configured to receive an identity authentication request message of the requester from the requester, the identity authentication request message of the requester includes an identity authentication code of the requester, the identity authentication code of the requester is obtained by the requester by using an identity authentication key to perform calculation on specified content including a first key.

The processing portion 802 is further configured to use the identity authentication key and the specified content to check the identity authentication code of the requester to obtain a check result, and determine an identity authentication result of the requester according to the check result, the identity authentication key is obtained by performing calculation on information including a pre-shared key between the requester and the authentication access controller.

Optionally, the authentication access controller 600/700/800 further includes a sending portion and a receiving portion.

The sending portion is configured to send a key negotiation request message to the requester, the key negotiation request message includes a first nonce generated by the authentication access controller.

The receiving portion is configured to receive a key negotiation response message sent by the requester, the key negotiation response message includes a second nonce generated by the requester.

The requesting portion 601/801 and/or the processing portion 701/802 are/is further configured to use a key derivation algorithm to perform calculation on information including the pre-shared key shared with the requester, the first nonce and the second nonce to obtain the identity authentication key.

Optionally, the key negotiation response message received by the receiving portion further includes a key exchange parameter of the requester, and the key exchange parameter of the requester is a result of using the identity authentication key to perform encryption calculation on a temporary public key generated by the requester.

The sending portion is further configured to send a key exchange parameter of the authentication access controller to the requester, the key exchange parameter of the authentication access controller being a result of using the identity authentication key to perform encryption calculation on information including a temporary public key generated by the authentication access controller.

The requesting portion 601/801 and/or the processing portion 701/802 are/is further configured to perform key exchange calculation according to a temporary private key corresponding to the temporary public key of the authentication access controller and a temporary public key recovered from the key exchange parameter of the requester to obtain the first key.

Optionally, the sending portion further calculates the key exchange parameter of the authentication access controller in the following manner: performing an XOR operation on a hash value of the identity authentication key and information including the temporary public key generated by the authentication access controller, or performing an XOR operation on an extended identity authentication key and information including the temporary public key generated by the authentication access controller, where the extended identity authentication key is calculated by the authentication access controller by using the key derivation algorithm according to information including the identity authentication key.

Optionally, the key negotiation response message received by the receiving portion further includes the first nonce, and the authentication access controller 600/700/800 further includes a verification portion.

The verification portion is configured to verify consistency between the first nonce in the key negotiation response message and the first nonce generated by the authentication access controller.

The requesting portion 601/801 and/or the processing portion 701/802 perform(s) the operation of calculating the identity authentication key when the verification is successful.

Optionally, the key negotiation request message sent by the sending portion further includes security capability parameter information supported by the authentication access controller, and the key negotiation response message received by the receiving portion further includes a particular security policy determined by the requester according to the security capability parameter information supported by the authentication access controller.

Optionally, the key negotiation request message sent by the sending portion further includes an identifier of the authentication access controller.

Correspondingly, the key negotiation response message received by the receiving portion further includes an identifier of the requester.

Optionally, the authentication access controller is used as a verifying party while the requester is used as a corresponding verified party; and the authentication access controller is also used as a verified party while the requester is used as a corresponding verifying party.

The specified content further includes an identifier of the requester when the authentication access controller is used as the verifying party, and the specified content further includes an identifier of the authentication access controller when the authentication access controller is used as the verified party.

Optionally, the authentication access controller 800 further includes a first calculation portion.

The first calculation portion is configured to use a shared key calculated according to information including the first key and the identity authentication key as a pre-shared key used for a next identity authentication process.

Optionally, the authentication access controller is used as a verifying party while the requester is used as a corresponding verified party; or, the authentication access controller is used as a verified party while the requester is used as a corresponding verifying party.

The specified content further includes an identifier of the authentication access controller and an identifier of the requester.

Optionally, the authentication access controller 600/700/800 further includes a second calculation portion.

The second calculation portion is configured to calculate a session key according to information including the first key and identifiers of the requester and the authentication access controller, the session key is used for subsequent secure communication between the requester and the authentication access controller.

Optionally, a message sent by the authentication access controller to the requester further includes a hash value calculated by the authentication access controller for a latest preceding message received from the requester.

Further, also provided in an embodiment of the present disclosure is a requester. The requester may be used as not only a verified party but also a verifying party, and may also have functions of both a verified party and a verifying party.

Figure 9:
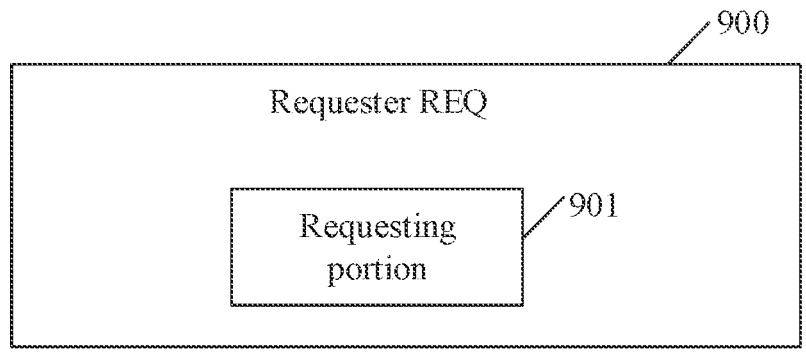
FIG. 9 is a structural block diagram of a requester (REQ) according to an embodiment of the present disclosure.

With reference to FIG. 9, a requester 900 used only as a verified party includes a requesting portion 901.

The requesting portion 901 is configured to send an identity authentication request message of the requester to the authentication access controller, the identity authentication request message of the requester includes an identity authentication code of the requester, where the identity authentication code of the requester is obtained by the requester by using an identity authentication key to perform calculation on specified content including a first key.

Figure 10:
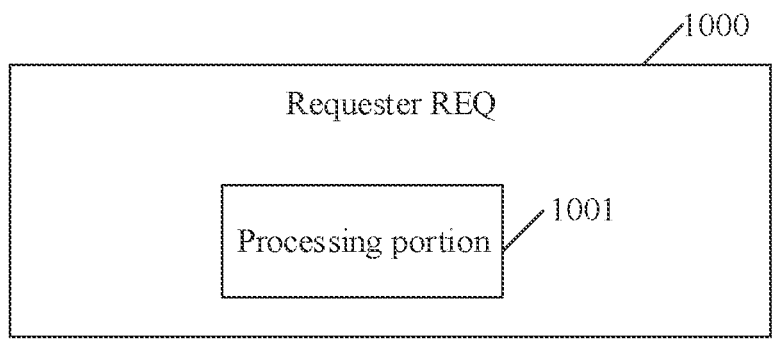
FIG. 10 is a structural block diagram of another requester (REQ) according to an embodiment of the present disclosure.

With reference to FIG. 10, a requester 1000 used only as a verifying party includes a processing portion 1001.

The processing portion 1001 is configured to receive an identity authentication request message of the authentication access controller from the authentication access controller, the identity authentication request message of the authentication access controller includes an identity authentication code of the authentication access controller, where the identity authentication code of the authentication access controller is obtained by the authentication access controller by using an identity authentication key to perform calculation on specified content including a first key.

The processing portion 1001 is further configured to use the identity authentication key and the specified content to check the identity authentication code of the authentication access controller to obtain a check result, and determine an identity authentication result of the authentication access controller according to the check result, the identity authentication key is obtained by performing calculation on information including a pre-shared key between the authentication access controller and the requester.

Figure 11:
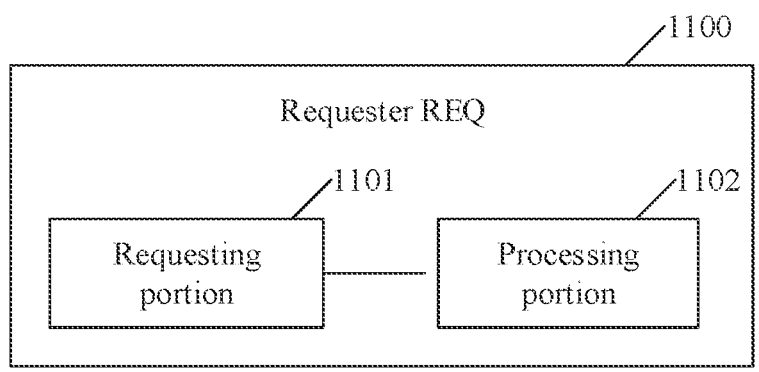
FIG. 11 is a structural block diagram of yet another requester (REQ) according to an embodiment of the present disclosure.

With reference to FIG. 11, a requester 1100 having both functions of a verified party and functions of a verifying party includes a requesting portion 1101 and a processing portion 1102.

a requesting portion 1101, configured to send an identity authentication request message of the requester to the authentication access controller, the identity authentication request message of the requester including an identity authentication code of the requester, where the identity authentication code of the requester is obtained by the requester by using an identity authentication key to perform calculation on specified content including a first key.

The processing portion 1102 is configured to receive an identity authentication request message of the authentication access controller from the authentication access controller, the identity authentication request message of the authentication access controller includes an identity authentication code of the authentication access controller, where the identity authentication code of the authentication access controller is obtained by the authentication access controller by using an identity authentication key to perform calculation on specified content including a first key.

The processing portion 1102 is further configured to use the identity authentication key and the specified content to check the identity authentication code of the authentication access controller to obtain a check result, and determine an identity authentication result of the authentication access controller according to the check result, the identity authentication key being obtained by performing calculation on information including a pre-shared key between the authentication access controller and the requester.

Optionally, the requester 900/1000/1100 further includes a receiving portion and a sending portion.

The receiving portion is configured to receive a key negotiation request message sent by the authentication access controller. The key negotiation request message includes a first nonce generated by the authentication access controller.

The sending portion is configured to send a key negotiation response message to the authentication access controller. The key negotiation response message includes a second nonce generated by the requester.

The requesting portion 901/1101 and/or the processing portion 1001/1102 are/is further configured to use a key derivation algorithm to perform calculation on information including the pre-shared key shared with the authentication access controller, the first nonce and the second nonce to obtain the identity authentication key.

Optionally, the key negotiation response message sent by the sending portion further includes a key exchange parameter of the requester, and the key exchange parameter of the requester is a result of using the identity authentication key to perform encryption calculation on information including a temporary public key generated by the requester.

The receiving portion is further configured to receive a key exchange parameter of the authentication access controller from the authentication access controller, the key exchange parameter of the authentication access controller is a result of using the identity authentication key to perform encryption calculation on information including a temporary public key generated by the authentication access controller.

The requesting portion 901/1101 and/or the processing portion 1001/1102 are/is further configured to perform key exchange calculation according to a temporary private key corresponding to the temporary public key of the requester and a temporary public key recovered from the key exchange parameter of the authentication access controller to obtain the first key.

Optionally, the sending portion further calculates the key exchange parameter of the requester by: performing an XOR operation on a hash value of the identity authentication key and the information including the temporary public key generated by the requester, or performing an XOR operation on an extended identity authentication key and the information including the temporary public key generated by the requester, where the extended identity authentication key is calculated by the requester by using the key derivation algorithm according to information including the identity authentication key.

Optionally, the key negotiation response message sent by the sending portion further includes the first nonce.

Optionally, the key negotiation request message received by the receiving portion further includes security capability parameter information supported by the authentication access controller, and the requester 900/1000/1100 further includes a determination portion.

The determination portion, configured to determine, according to the security capability parameter information, a particular security policy used by the requester.

The key negotiation response message sent by the sending portion further includes the particular security policy.

Optionally, the key negotiation request message received by the receiving portion further includes an identifier of the authentication access controller.

Correspondingly, the key negotiation response message sent by the sending portion further includes an identifier of the requester.

Optionally, the requester is used as a verified party while the authentication access controller is used as a corresponding verifying party; and the requester is also used as a verifying party while the authentication access controller is used as a corresponding verified party.

The specified content further includes an identifier of the requester when the requester is used as the verified party, and the specified content further includes an identifier of the authentication access controller when the requester is used as the verifying party.

Optionally, the requester 1100 further includes a first calculation portion.

The first calculation portion is configured to use a shared key calculated according to information including the first key and the identity authentication key as a pre-shared key used for a next identity authentication process.

Optionally, the requester is used as a verified party while the authentication access controller is used as a corresponding verifying party: or, the requester is used as a verified party while the authentication access controller is used as a corresponding verifying party.

The specified content further includes an identifier of the authentication access controller and an identifier of the requester.

Optionally, the requester 900/1000/1100 further includes a second calculation portion.

The second calculation portion is configured to calculate a session key according to information including the first key and identifiers of the requester and the authentication access controller, the session key being used for subsequent secure communication between the requester and the authentication access controller.

Optionally, a message sent by the requester to the authentication access controller further includes a hash value calculated by the requester for a latest preceding message received from the authentication access controller.

In the embodiments of the present disclosure and other embodiments, the "portion" may be some circuits, some processors, some programs or software, or the like, or certainly, may be units, and may be modular or non-modular.

Figure 12:
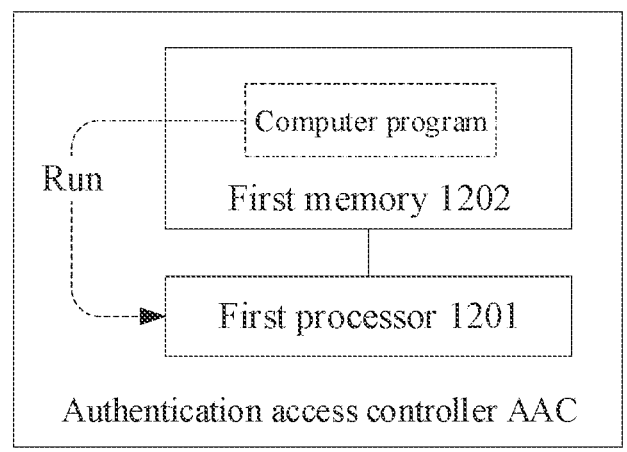
FIG. 12 is a block diagram of a hardware structure of an authentication access controller (AAC) according to an embodiment of the present disclosure.

With reference to FIG. 12, further provided in an embodiment of the present disclosure is an authentication access controller (AAC), including: a first processor 1201 and a first memory 1202. The first processor 1201 calls a computer program from the first memory 1202, and run the computer program so as to perform the operations performed by the AAC in the above embodiments.

The first memory 1202 may be a separate device independent of the first processor 1201, or may be integrated in the first processor 1201.

It should be understood that the authentication access controller can implement the respective processes implemented by the AAC in the various methods of the embodiments of the present disclosure. For brevity, details will not be described herein again.

Figure 13:
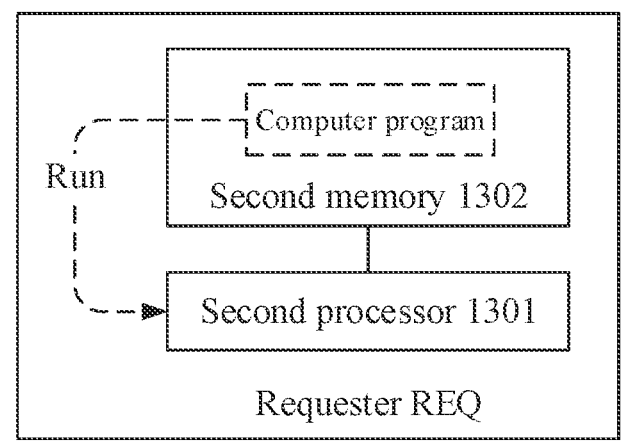
FIG. 13 is a block diagram of a hardware structure of a requester (REQ) according to an embodiment of the present disclosure.

With reference to FIG. 13, further provided in an embodiment of the present disclosure is a requester (REQ), including: a second processor 1301 and a second memory 1302. The second processor 1301 can call a computer program from the second memory 1302, and run the computer program so as to perform the operations performed by the REQ in the above embodiments.

The second memory 1302 may be a separate device independent of the second processor 1301, or may be integrated in the second processor 1301.

It should be understood that the requester can implement the respective processes implemented by the REQ in the various methods of the embodiments of the present disclosure. For brevity, details will not be described herein again.

Also provided in an embodiment of the present disclosure is a computer-readable storage medium, having a computer program stored thereon, the computer program performing, when run by a processor, operations performed by the authentication access controller (AAC) or the requester (REQ) in the above identity authentication method. The storage medium may be a volatile or non-volatile computer-readable storage medium.

Also provided in an embodiment of the present disclosure is a computer program, including computer-readable code, where when the computer-readable code is run in an electronic apparatus, a processor in the electronic apparatus performs operations performed by the authentication access controller (AAC) or the requester (REQ) in the above identity authentication method.

Also provided in an embodiment of the present disclosure is a computer program product, including computer program instructions used to perform operations performed by the authentication access controller (AAC) or the requester (REQ) in the above identity authentication method. Reference can be made to the above method embodiments, and details will not be described herein again.

The above authentication access controller and requester are used to perform the identity authentication method provided in the embodiment of the present disclosure. Mutual or unilateral identity authentication is performed between an authentication access controller and a requester by using a pre-shared key, to lay the foundation for ensuring that a user accessing a network is legal and/or a network accessed by a user is legal, so as to achieve secure communication between the requester and the authentication access controller. In addition, in an identity authentication process, a verified party performs calculation on information including a pre-shared key of the two parties and a nonce generated by each of the two parties to obtain an identity authentication key, and uses the identity authentication key to perform calculation on specified content to obtain an identity authentication code of the verified party. Compared with the prior art, such an identity authentication code calculation manner provided in the embodiment of the present disclosure incorporates key exchange calculation, which enhances the capability of the authentication process against dictionary brute force attacks or quantum computation attacks is enhanced through the ingenious detail design.

Those of ordinary skill in the art can understand that all or some of the operations in the above method embodiments may be implemented through a program instructing relevant hardware. The program may be stored in a computer-readable storage medium. When executed, the program performs the operations in the above method embodiments.

The storage medium may be at least one of the following media: a read-only memory (ROM), a RAM, a magnetic disk, an optical disc, or any medium capable of storing program code.

It should be noted that the embodiments in the present specification are described in a progressive manner, and for identical or similar parts between different embodiments, reference may be made to each other so that each of the embodiments focuses on differences from other embodiments. Especially, the apparatus and system embodiments are described relatively briefly because of being consistent with and corresponding to the method embodiments, and for related parts, reference may be made to the method embodiments. The apparatus and system embodiments described above are merely illustrative. The portions described as separate components may or may not be physically separated, and the components shown as portions may or may not be physical portions, which may be located in one place or may be distributed onto a plurality of network portions. The objective of the solution of this embodiment may be achieved by selecting some or all of the modules according to actual requirements. Those of ordinary skill in the art can understand and perform implementation without creative efforts.

The above description is merely a specific embodiment of the present disclosure, and the scope of protection of the present disclosure is not limited thereto. Any changes or replacements that would be readily conceivable to any person skilled in the art within the technical scope disclosed by the present disclosure shall fall within the scope of protection of the present disclosure. Therefore, the scope of protection of the present disclosure is subject to the scope of protection of the claims.

INDUSTRIAL APPLICABILITY

Disclosed in an embodiment of the present disclosure is an identity authentication method. Mutual or unilateral identity authentication is performed between an authentication access controller and a requester by using a pre-shared key, to lay the foundation for ensuring that a user accessing a network is legal and/or a network accessed by a user is legal, so as to achieve secure communication between the requester and the authentication access controller. In addition, in an identity authentication process, a verified party performs calculation on information including a pre-shared key of the two parties and a nonce generated by each of the two parties to obtain an identity authentication key, and uses the identity authentication key to perform calculation on specified content to obtain an identity authentication code of the verified party. Such an identity authentication code calculation manner provided in the embodiment of the present disclosure incorporates key exchange calculation, which enhances the capability of the authentication process against dictionary brute force attacks or quantum computation attacks is enhanced through the ingenious detail design. Also disclosed in embodiments of the present disclosure are an authentication access controller, a requester, a storage medium, a program, and a program product.

The invention claimed is:

1. An identity authentication method, one of a requester and an authentication access controller being used as a verified party, and the other one being used as a verifying party, the method comprising:
sending, by the verified party, an identity authentication request message of the verified party to the verifying party, the identity authentication request message of the verified party comprising an identity authentication code of the verified party, wherein the identity authentication code of the verified party is obtained by the verified party by using an identity authentication key to perform calculation on specified content, the specified content comprises a first key, the first key is negotiated by the verified party and the verifying party, and the first key is obtained by the verified party by performing key exchange calculation according to a temporary private key corresponding to a key exchange parameter of the verified party and a temporary public key recovered from a key exchange parameter of the verifying party;
using, by the verifying party, the identity authentication key and the specified content to check the identity authentication code of the verified party to obtain a check result, the identity authentication key being obtained by performing calculation on information comprising a pre-shared key between the verifying party and the verified party; and
determining, by the verifying party, an identity authentication result of the verified party according to the check result.

2. The method of claim 1, further comprising:
sending, by the authentication access controller, a key negotiation request message to the requester, the key negotiation request message comprising a first nonce generated by the authentication access controller;
sending, by the requester, a key negotiation response message to the authentication access controller, the key negotiation response message comprising a second nonce generated by the requester;
using, by the requester, a key derivation algorithm to perform calculation on information comprising the pre-shared key shared with the authentication access controller, the first nonce and the second nonce to obtain the identity authentication key; and
using, by the authentication access controller, the key derivation algorithm to perform calculation on the information comprising the pre-shared key shared with the requester, the first nonce and the second nonce to obtain the identity authentication key.

3. The method of claim 2, wherein the key negotiation response message further comprises a key exchange parameter of the requester, and the key exchange parameter of the requester is obtained by using the identity authentication key to perform encryption calculation on information comprising a temporary public key generated by the requester, the method further comprising:
sending, by the authentication access controller, a key exchange parameter of the authentication access controller to the requester, the key exchange parameter of the authentication access controller being obtained by using the identity authentication key to perform encryption calculation on information comprising a temporary public key generated by the authentication access controller; and
performing, by each one of the requester and the authentication access controller, key exchange calculation according to a temporary private key corresponding to the temporary public key of said one of the requester and the authentication access controller and a temporary public key recovered from the key exchange parameter of the other one of the requester and the authentication access controller to obtain the first key.

4. The method of claim 3, wherein
obtaining the key exchange parameter of the requester comprises: performing, by the requester, an exclusive or (XOR), operation on a hash value of the identity authentication key and the information comprising the temporary public key generated by the requester, and
obtaining the key exchange parameter of the authentication access controller comprises: performing, by the authentication access controller, an XOR operation on the hash value of the identity authentication key and the information comprising the temporary public key generated by the authentication access controller;
or,
obtaining the key exchange parameter of the requester comprises: performing, by the requester, an XOR operation on the information comprising the temporary public key generated by the requester and an extended identity authentication key that is calculated by the requester by using the key derivation algorithm according to information comprising the identity authentication key, and
obtaining the key exchange parameter of the authentication access controller comprises: performing, by the authentication access controller, an XOR operation on the information comprising the temporary public key generated by the authentication access controller and an extended identity authentication key that is calculated by the authentication access control by using the key derivation algorithm according to information comprising the identity authentication key.

5. The method of claim 2, wherein the key negotiation response message further comprises the first nonce, and before the authentication access controller calculates the identity authentication key, the method further comprises:
verifying, by the authentication access controller, consistency between the first nonce in the key negotiation response message and the first nonce generated by the authentication access controller; and
in response to the verification being successful, performing, by the authentication access controller, a relevant operation.

6. The method of claim 2, wherein the key negotiation request message further comprises security capability parameter information supported by the authentication access controller, and the method further comprises:
determining, by the requester according to the security capability parameter information, a particular security policy used by the requester,
wherein the key negotiation response message further comprises the particular security policy.

7. The method of claim 2, wherein the key negotiation request message further comprises an identifier of the authentication access controller, and
the key negotiation response message further comprises an identifier of the requester.

8. The method of claim 1, wherein one of the requester and the authentication access controller is used as the verified party, and the other one is used as the verifying party comprises:
the requester is used as the verified party while the authentication access controller is used as the verifying party; and the authentication access controller is also used as the verified party while the requester is used as the verifying party,
wherein the specified content further comprises an identifier of the requester when the requester is used as the verified party, and
the specified content further comprises an identifier of the authentication access controller when the authentication access controller is used as the verified party.

9. The method of claim 8, wherein, in response to the requester verifying that an identity of the authentication access controller is legal and the authentication access controller verifying that an identity of the requester is legal, the method further comprises:
using, by each of the requester and the authentication access controller, a shared key calculated according to information comprising the first key and the identity authentication key as a pre-shared key for a next identity authentication process.

10. The method of claim 1, wherein one of the requester and the authentication access controller is used as the verified party, and the other one is used as the verifying party comprises:
the requester is used as the verified party, and the authentication access controller is used as the verifying party; or, the authentication access controller is used as the verified party, or the requester is used as the verifying party,
wherein the specified content further comprises an identifier of the authentication access controller and an identifier of the requester.

11. The method of claim 8, wherein, in response to at least one of: the requester verifying that an identity of the authentication access controller is legal, or the authentication access controller verifies that an identity of the requester is legal, the method further comprises:
using, by the requester and the authentication access controller, a session key to perform subsequent secure communication, the session key being calculated by each of the requester and the authentication access controller according to information comprising the first key and the identifiers of the requester and the authentication access controller.

12. The method of claim 1, wherein a message sent by the requester to the authentication access controller further comprises a hash value calculated by the requester for a latest preceding message received from the authentication access controller, and the method further comprises:
in response to receiving the message from the requester, the authentication access controller first verifies the hash value in the message, and then performs a subsequent operation when the verification is successful, and
wherein a message sent by the authentication access controller to the requester further comprises a hash value calculated by the authentication access controller for a latest preceding message received from the requester, and the method further comprises:
in response to receiving the message from the authentication access controller, the requester first verifies the hash value in the message, and then performs a subsequent operation when the verification is successful.

13. An authentication access controller, comprising at least one of a requesting circuit or a processor, wherein
the requesting circuit is configured to send an identity authentication request message of the authentication access controller to a requester, the identity authentication request message of the authentication access controller comprises an identity authentication code of the authentication access controller, wherein the identity authentication code of the authentication access controller is obtained by the authentication access controller by using an identity authentication key to perform calculation on specified content comprising a first key, the first key is negotiated by the authentication access controller and the requester, and the first key is obtained by the authentication access controller by performing key exchange calculation according to a temporary private key corresponding to a key exchange parameter of the authentication access controller and a temporary public key recovered from a key exchange parameter of the requester;

the processor is configured to receive an identity authentication request message of the requester from the requester, the identity authentication request message of the requester comprising an identity authentication code of the requester, wherein the identity authentication code of the requester is obtained by the requester by using the identity authentication key to perform calculation on the specified content comprising the first key, the first key is negotiated by the requester and the authentication access controller, and the first key is obtained by the requester by performing key exchange calculation according to a temporary private key corresponding to a key exchange parameter of the requester and a temporary public key recovered from a key exchange parameter of the authentication access controller; and the processor is further configured to use the identity authentication key and the specified content to check the identity authentication code of the requester to obtain a check result, and determine an identity authentication result of the requester according to the check result, the identity authentication key is obtained by performing calculation on information comprising a pre-shared key between the requester and the authentication access controller.

14. A requester, comprising a requesting circuit or a processor, wherein the requesting circuit is configured to send an identity authentication request message of the requester to an authentication access controller, the identity authentication request message of the requester comprises an identity authentication code of the requester, wherein the identity authentication code of the requester is obtained by the requester by using an identity authentication key to perform calculation on specified content comprising a first key, the first key is negotiated by the requester and the authentication access controller, and the first key is obtained by the requester by performing key exchange calculation according to a temporary private key corresponding to a key exchange parameter of the requester and a temporary public key recovered from a key exchange parameter of the authentication access controller;

the processor is configured to receive an identity authentication request message of the authentication access controller from the authentication access controller, the identity authentication request message of the authentication access controller comprises an identity authentication code of the authentication access controller, wherein the identity authentication code of the authentication access controller is obtained by the authentication access controller by using the identity authentication key to perform calculation on the specified content comprising the first key, the first key is negotiated by the authentication access controller and the requester, and the first key is obtained by the authentication access controller by performing key exchange calculation according to a temporary private key corresponding to a key exchange parameter of the authentication access controller and a temporary public key recovered from a key exchange parameter of the requester; and the processor is further configured to use the identity authentication key and the specified content to check the identity authentication code of the authentication access controller to obtain a check result, and determine an identity authentication result of the authentication access controller according to the check result, the identity authentication key is obtained by performing calculation on information comprising a pre-shared key between the authentication access controller and the requester.

15. The requester of claim 14, further comprising:

a transceiver, configured to receive a key negotiation request message from the authentication access controller, the key negotiation request message comprising a first nonce generated by the authentication access controller, wherein the transceiver is further configured to send a key negotiation response message to the authentication access controller, the key negotiation response message comprising a second nonce generated by the requester, wherein at least one of the requesting circuit or the processor is further configured to use a key derivation algorithm to perform calculation on information comprising the pre-shared key shared with the authentication access controller, the first nonce and the second nonce to obtain the identity authentication key.

16. The requester of claim 15, wherein the key negotiation response message sent by the transceiver further comprises a key exchange parameter of the requester, and the key exchange parameter of the requester is obtained by using the identity authentication key to perform encryption calculation on information comprising a temporary public key generated by the requester, the transceiver is further configured to receive a key exchange parameter of the authentication access controller from the authentication access controller, the key exchange parameter of the authentication access controller is obtained by using the identity authentication key to perform encryption calculation on information comprising a temporary public key generated by the authentication access controller, and at least one of the requesting circuit or the processor is further configured to perform key exchange calculation according to a temporary private key corresponding to the temporary public key of the requester and a temporary public key recovered from the key exchange parameter of the authentication access controller to obtain the first key.

17. The requester of claim 16, wherein the transceiver further calculates the key exchange parameter of the requester by: performing an exclusive or (XOR) operation on a hash value of the identity authentication key and the information comprising the temporary public key generated by the requester, or performing an XOR operation on an extended identity authentication key and the information comprising the temporary public key generated by the requester, wherein the extended identity authentication key is calculated by the requester by using the key derivation algorithm according to information comprising the identity authentication key.

18. The requester of claim 14, wherein the requester is used as a verified party while the authentication access controller is used as a verifying party; and the requester is also used as a verifying party while the authentication access controller is used as a verified party, and wherein the specified content further comprises an identifier of the requester when the requester is used as the verified party, and the specified content further comprises an identifier of the authentication access controller when the requester is used as the verifying party; or the requester is used as a verified party while the authentication access controller is used as a verifying party; or, the requester is used as a verified party while the authentication access controller is used as a verifying party, and wherein the specified content further comprises an identifier of the authentication access controller and an identifier of the requester.

19. The requester of claim 15, further comprising:
a first calculation circuit, configured to use a shared key calculated according to information comprising the first key and the identity authentication key as a pre-shared key used for a next identity authentication process.

20. The requester of claim 14, further comprising:
a second calculation circuit, configured to calculate a session key according to information comprising the first key and identifiers of the requester and the authentication access controller, the session key being used for subsequent secure communication between the requester and the authentication access controller.

\* \* \* \* \*